(12) United States Patent
Dotterweich et al.

(10) Patent No.: US 11,625,971 B2
(45) Date of Patent: Apr. 11, 2023

(54) SECURE LOCKERS FOR USE AS ITEM EXCHANGE POINTS

(71) Applicant: United Parcel Service of America, Inc., Atlanta, GA (US)

(72) Inventors: Andrew Dotterweich, Alpharetta, GA (US); Jeffrey Cooper, Marietta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 369 days.

(21) Appl. No.: 15/658,071

(22) Filed: Jul. 24, 2017

(65) Prior Publication Data

US 2018/0033235 A1 Feb. 1, 2018

Related U.S. Application Data

(60) Provisional application No. 62/367,498, filed on Jul. 27, 2016.

(51) Int. Cl.
| | |
|---|---|
| *G06Q 10/08* | (2012.01) |
| *G06F 17/12* | (2006.01) |
| *G07F 17/12* | (2006.01) |
| *G07C 9/00* | (2020.01) |
| *G06Q 10/0836* | (2023.01) |
| *G06Q 30/06* | (2023.01) |

(52) U.S. Cl.
CPC ......... *G07F 17/12* (2013.01); *G07C 9/00896* (2013.01); *G06Q 10/0836* (2013.01); *G06Q 30/06* (2013.01); *G07C 9/00912* (2013.01)

(58) Field of Classification Search
CPC .. G06Q 10/0836; G06Q 10/08; G06Q 10/083; G06Q 10/02; G06Q 30/0601; G06Q 30/0645; G06Q 10/08355; G07F 17/12; G07F 17/13
See application file for complete search history.

(56) References Cited

U.S. PATENT DOCUMENTS

| | | |
|---|---|---|
| 10,089,808 B2 | 10/2018 | Perez et al. |
| 10,210,474 B2 | 2/2019 | Robinson et al. |
| 2002/0014953 A1 | 2/2002 | Stephens et al. |

(Continued)

OTHER PUBLICATIONS

Perez, C. (Jun. 28, 2014). Know before you go. Florida Today Retrieved from https://dialog.proquest.com/professional/docview/1541208645?accountid=131444 (Year: 2014).*

(Continued)

*Primary Examiner* — Michael P Harrington
(74) *Attorney, Agent, or Firm* — Shook, Hardy & Bacon L.L.P.

(57) ABSTRACT

A secure, computerized locker bank that is adapted to facilitate the payment for, and physical exchange of an item between entities who have brokered the sale of the item via a marketplace, such as an on-line marketplace (e.g., an on-line auction site, an on-line classified advertisement site, or an online retail marketplace), or a traditional marketplace (e.g., traditional paper classified advertisements). In particular embodiments, each locker in the computerized locker bank comprises one or more imaging devices for allowing a potential purchaser to view an item (e.g., stored within a locker) before purchasing the item and retrieving it from the locker.

24 Claims, 7 Drawing Sheets

(56) References Cited

U.S. PATENT DOCUMENTS

| | | |
|---|---|---|
| 2002/0016765 A1 | 2/2002 | Sacks |
| 2002/0035515 A1 | 3/2002 | Moreno |
| 2002/0184497 A1* | 12/2002 | Gage ................ G06Q 10/087 |
| | | 713/168 |
| 2005/0083176 A1* | 4/2005 | Yamada ............. G06Q 10/02 |
| | | 705/16 |
| 2013/0166067 A1 | 6/2013 | Irwin et al. |
| 2013/0261792 A1 | 10/2013 | Gupta et al. |
| 2014/0279668 A1 | 9/2014 | Lievens et al. |
| 2014/0333761 A1* | 11/2014 | Porter ................ G07F 7/069 |
| | | 348/135 |
| 2015/0012431 A1* | 1/2015 | Gomez De Sebastian ............... |
| | | G06Q 20/382 |
| | | 705/44 |
| 2015/0106291 A1 | 4/2015 | Robinson et al. |
| 2015/0106292 A1 | 4/2015 | Robinson et al. |
| 2015/0112887 A1* | 4/2015 | Camp ............. G06Q 10/0836 |
| | | 705/339 |
| 2015/0186840 A1* | 7/2015 | Torres ................ A47B 81/00 |
| | | 705/339 |
| 2015/0356801 A1* | 12/2015 | Nitu ................ G07C 9/00904 |
| | | 340/5.61 |
| 2016/0216106 A1* | 7/2016 | Motoyama ........... G01B 11/28 |
| 2019/0254461 A1* | 8/2019 | Geng ................ A47G 29/141 |

OTHER PUBLICATIONS

International Search Report and Written Opinion dated Oct. 5, 2017 in International Patent Application No. PCT/US2017/043642, 14 pages.

Extended European Search Report received for European Patent Application No. 17835093.0, dated Feb. 14, 2020, 11 pages.

Office Action received for Canadian Patent Application No. 3,030,300, dated Mar. 15, 2021, 5 pages.

* cited by examiner

SECURE LOCKERS FOR USE AS ITEM EXCHANGE POINTS

CROSS-REFERENCE TO RELATED APPLICATIONS

This application claims the benefit under 35 U.S.C § 119(e) of U.S. Application No. 62/367,498 filed Jul. 27, 2016, which is incorporated herein by reference.

BACKGROUND

An in-person exchange between private individuals, or other entities, of items sold via a classified ad (such as a traditional or online classified ad), online auction, or online retail sale, can be undesirable due to the inherent danger of exchanging valuable items or cash with strangers. Accordingly, there is a need for improved systems and processes for facilitating such exchanges in a safe and convenient manner.

SUMMARY OF THE VARIOUS EMBODIMENTS

A locker bank used for facilitating an exchange of one or more items between two individuals (e.g., two strangers) sold via a traditional or on-line classified advertisement, or via an on-line marketplace, according to various embodiments, comprises a plurality of lockers. In particular embodiments, each respective locker comprises: (1) a housing defining an interior storage portion that is dimensioned for selectively receiving and storing one or more items; and (2) at least one door for selectively preventing access to one or more items stored within the interior storage portion. The locker bank further comprises one or more computer systems that comprise a computer processor and memory. The one or more computer systems, which may be local or remote, are individually or collectively adapted for: (1) receiving a request, from a user, to store an item within the locker bank for later pickup by an individual who has purchased the item via an on-line marketplace; (2) at least partially in response to (e.g., in response to) receiving the request: (a) opening a particular door of a particular locker of the plurality of lockers to permit access to an interior storage portion of the particular locker; (b) receiving one or more particular items into the particular locker's interior storage portion; and (c) registering the closing and locking of the particular door; (3) after the step of registering the closing of the particular door, receiving a request, by a purchaser of the item, to retrieve the one or more particular items from the locker; (4) at least partially in response to receiving the request to retrieve the one or more particular items from the locker, facilitating payment for the one or more particular items by the purchaser; (5) confirming that payment has been received for the one or more particular items; and (6) at least partially in response to confirming that payment has been received for the one or more particular items, unlocking a door of the particular locker so that the purchaser can retrieve the one or more particular items from the interior storage portion of the particular locker.

A locker bank for capturing one or more images of an item stored within an interior storage portion of a particular locker in the locker bank, according to some embodiments, comprises a plurality of lockers. Each respective locker comprises: (1) a housing defining an interior storage portion that is dimensioned for selectively receiving and storing one or more items; (2) at least one door for selectively preventing access to one or more items stored within the interior storage portion; and (3) at least one camera for capturing an image of an item when the item is positioned within the interior storage portion. The locker bank further comprises one or more computer systems, having a computer processor and memory, which may be local or remote, and are individually or collectively adapted for using the camera to capture an image of an item that is stored within the interior storage portion of a particular locker of the plurality of lockers.

An attended delivery/pickup location used as an exchange point for items purchased via an online or offline marketplace, according to various embodiments, comprises one or more computer systems that each comprise one or more computer processors and memory, which may include, for example, one or more local or one or more remote computer systems. In particular embodiments, the one or more computer systems are individually or collectively adapted for: (1) receiving a request, from a seller, to store an item at the attended delivery/pickup location for later pickup by an individual who has purchased the item via a transaction made using an on-line marketplace; (2) at least partially in response to receiving the request, receiving a confirmation of receipt of the item at the attended delivery/pickup location; (3) after the step of receiving confirmation of receipt of the item at the attended delivery/pickup location, receiving a request, by a purchaser of the item to retrieve the item from the attended delivery/pickup location; (4) at least partially in response to receiving the request to retrieve the item from the attended delivery/pickup location, facilitating payment for the item by the purchaser; (5) confirming that payment has been received for the item; and (6) at least partially in response to confirming that payment has been received for the item, facilitating transfer of the payment to the seller and facilitating transfer of the item to the purchaser.

BRIEF DESCRIPTION OF THE DRAWINGS

Various embodiments of a system and method for using a computerized locker bank as an exchange point for use by entities to safely and securely exchange items (e.g., for cash or trade payment) is described below. In the course of this description, reference will be made to the accompanying drawings, which are not necessarily drawn to scale, and wherein.

DETAILED DESCRIPTION OF VARIOUS EMBODIMENTS

Figure 1:
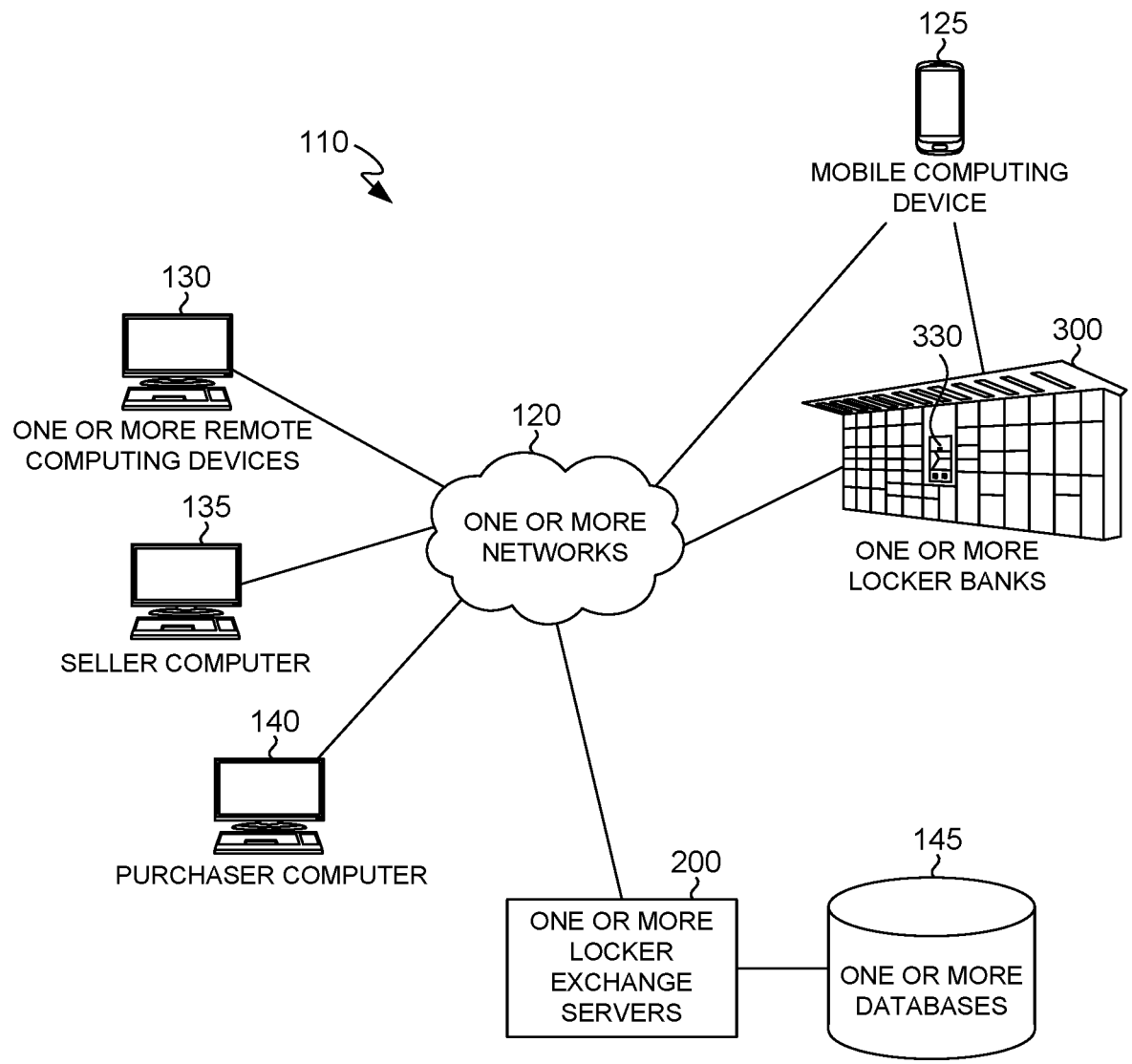
FIG. 1 is a block diagram of an item exchange system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Online marketplaces and classified advertisement websites such as Craigslist have made it easy for entities (e.g., individuals, businesses, or other organizations) to list and sell items to other entities in their community, city, etc. An entity may, for example, list an item for sale at a particular fixed price, or place the item up for auction. The selling entity may then negotiate or complete the sale with a purchaser (who may also be an individual, business, or other organization) via e-mail, telephone, text message, or other communication medium (e.g., through an online classified advertisement website or other online marketplace). Once the sale has been negotiated, the buyer and seller may meet in person to exchange the item and coordinate payment to the seller. The need to complete the exchange in person can be undesirable for several reasons including safety concerns. For example, it may be frightening for the buyer to meet the seller within the context of sale, since the seller will know that the buyer is bringing cash to purchase the item. Similarly, it may be frightening for the seller to meet with an unknown buyer within the context of a sale, since the unknown buyer will know that the seller is bringing the item (which may be valuable) to the place of the sale.

A locker exchange point, such as the various embodiments of a locker exchange point described herein, may provide a safe alternative to such in-person exchanges by: (1) enabling a seller to deposit an item for the purchaser without having to interact with or otherwise meet the purchaser in person; (2) enabling the purchaser to pick up the item without having to interact with or otherwise meet the seller in person; and (3) enabling the purchaser to complete a financial transaction for an agreed-upon purchase price without having to carry a potentially large amount of cash to complete the transaction (e.g., by using a credit card, debit card, etc. to pay for the item at a computerized locker bank).

In particular embodiments, a locker exchange point may comprise computerized locker banks that each comprise a plurality of lockers and one or more computer systems for facilitating the transfer of items and payment between a potential buyer and a potential seller, where the sale of the items is brokered, in advance, via an online classified website or other online marketplace, or via a more traditional marketplace such as a classifieds page in a traditional newspaper. The seller and the purchaser may each be any suitable entity.

Once a seller and purchaser have agreed to a sale, the seller and/or purchaser may elect to have the item placed in one of the locker bank's lockers until the item is later retrieved from the locker by the purchaser. In particular embodiments, the transfer of payment for the sale of the item may occur online, or at the locker bank selected by the seller and/or purchaser (e.g., when the item is picked up by the purchaser). The seller and/or the purchaser may select the locker at the time of "checkout" on a website used to facilitate the transaction, or during direct communications regarding the purchase of the item. The selection of the locker may be based, for example, on the proximity of the locker bank to either the seller or the purchaser, or on any other suitable factor.

After selecting a locker bank for the item, the seller, the purchaser, or the item exchange system 110 may determine a particular locker within the locker bank for the item. In some embodiments, the system may assign a particular locker when the seller arrives at the locker bank to deposit the item. In various embodiments, the system may be configured to determine a suitable locker for the item, for example, based at least in part on a size of the item (e.g., a specified relative size of the item, such as small, medium, or large; the physical dimensions of the item; the item's dimensional weight, cube, etc.). Item size information may be received by the system, in various embodiments from: (1) the seller; (2) a carrier that may be coordinating delivery of the item to the locker bank; (3) the purchaser and/or (4) any other party with knowledge of the item being sold.

Once a locker bank has been selected, the system may provide both the seller and the purchaser with instructions for depositing and retrieving the item from the locker. For example, the system may provide the seller and the purchaser each with a suitable access code for accessing the locker. In various embodiments, the access code may be a different code for each of the seller and the purchaser. In some embodiments, the system may allow the seller and the purchaser to select their own access code so that they will be able to remember the code more easily.

In various embodiments, the system may be configured to take and/or receive one or more images of an item prior to the item being placed in a locker or after the item is placed in the locker. For example, prior to placing the item within the locker, the system may request that the seller capture one or more images of the item using an imaging device associated with the locker bank computer. In some embodiments, the system may alternatively or also capture one or more images of the item using one or more imaging devices located inside a particular locker after the item has been placed in the locker and the locker door has been closed and locked.

In various embodiments, one or more of the lockers within the locker bank may comprise a suitable mechanism for rotating, spinning, or otherwise reorienting the item in the locker while the one or more imaging devices within the locker take images of the item. The mechanism may include, for example, a motorized turntable, such as Lazy Susan, or other suitable mechanical device for repositioning the item within the locker. This may be helpful in capturing multiple images of the item from different angles.

In certain embodiments, before or after the seller inserts the item into the locker, the system may prompt the seller to capture one or more images using an application on the seller's mobile computing device. The app resident on the seller's mobile computing device may then upload the image to the item exchange system, which associates the image with the particular locker.

Regardless of how the images are captured, the system may send these captured images to the seller and/or the purchaser for use in assessing the condition of the item within the locker. A purchaser may, for example, use the images to decide whether to actually purchase the item. A seller may, for example, use the images to decide whether to accept an item for return.

After the item has been placed in the locker, the system may facilitate the locking and closing of the locker's door in any suitable manner. For example, in some embodiments, the system may instruct the seller to close and lock the locker. In further embodiments, the system may instruct the seller to close the locker and after sensing the locker is closed (e.g., proximity sensor, hall effect sensor), the system may automatically lock the locker. In other embodiments, the system may automatically close and lock the locker after a predetermined amount of time. In various embodiments, the system is configured to notify the purchaser, once the item has been placed securely in the locker, that the item is available for retrieval.

In retrieving the item from the locker, the purchaser may follow steps similar to those described above in relation to the seller placing the item within the locker. For example, the system may require the purchaser to enter an access code to open the particular locker housing the item. The system may also require that the purchaser provide payment information for the item if payment has not already been provided and/or processed during an online or previous in-person transaction between the seller and the purchaser. In various embodiments, the system may receive payment from the purchaser in any suitable manner (e.g., by credit card, cash payment, electronic bank transfer, bit coin transfer, etc.). The locker bank may, for example, include any suitable point-of-sale device (e.g., credit card reader, dollar bill validator, etc.) for completion of a financial portion of the sales transaction. After determining that payment for the item has been made, the system opens the locker for the purchaser to retrieve the item.

In a traditional in-person exchange, a purchaser would have the opportunity to inspect the item prior to completing a purchase. Although, in various embodiments described herein, the purchaser will be able to view one or more images of the item taken by the system or the seller in advance of paying for and retrieving the item, the purchaser may still be unsatisfied with the item after retrieving it from the locker. In instances where the purchaser decides to return the item for any reason, the system may facilitate the return of the item to the seller via the locker bank. In some embodiments, the system may allow the purchaser to submit a return request and then place the item back into the locker that the purchaser retrieved the item from. In other embodiments, the system may open a different locker for placement of the returned item.

Similar to the seller placing the item for retrieval by the purchaser, the system may require the purchaser to use the locker bank computer to capture images of the item prior to placement within the locker and/or may capture one or more images of the item using an imaging device within the locker after the item has been placed in the locker and the locker has been closed and locked. One or more of these images may then be sent to the seller and/or the purchaser. In particular embodiments, the system may not accept the return from the purchaser by opening the locker until the system receives an indication from the seller that the return is acceptable. If the seller indicates that the return is acceptable (or if the system automatically deems the return to be acceptable), the system may then open a suitable locker for the item, facilitate closing and locking the locker, and process the return according to instructions from the seller. For example, the system may process a refund to the purchaser and transmit a new access code to the seller that the seller can use to retrieve the item from the locker. In further embodiments, if the system receives an indication that the return is unacceptable by the seller after sending images taken by the imaging device in the locker, the system may open the locker to allow the purchaser to retrieve the item.

Exemplary Technical Platforms

As will be appreciated by one skilled in the relevant field, a system for using a locker bank as an item exchange point for purchases may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of an item exchange system 110 according to a particular embodiment. As may be understood from this figure, the item exchange system 110 includes one or more computer networks 120 that facilitate communication between: (1) one or more mobile computing devices 125; (2) one or more locker exchange servers 200, which may, for example, be connected to selectively store information to, and retrieve information from, one or more databases 145; (3) one or more computerized locker banks 300 with an associated internal computer 330; and (4) and one or more other computing devices, such as a seller computer 135, a purchaser computer 140, and one or more other computing devices 130 that are remote from the one or more locker banks 300.

The one or more computer networks 120 may include any of a variety of types of wired or wireless computer networks such as the Internet (or other WAN), a Local Area Network (LAN), a private intranet, a public switch telephone network (PSTN), a mesh network, or any other type of network (e.g., a network that uses Bluetooth (standard or low energy Bluetooth), beacon communication technologies (e.g., iBeacon), and/or near field communications to facilitate communication between computing devices). In particular embodiments, a communication link between the one or more locker banks 300 and the mobile computing device 125 may be implemented via the Internet (or other WAN), beacon communication technologies, WIFI, Bluetooth, near-field communication (NFC) or any other suitable communication link.

Figure 2:
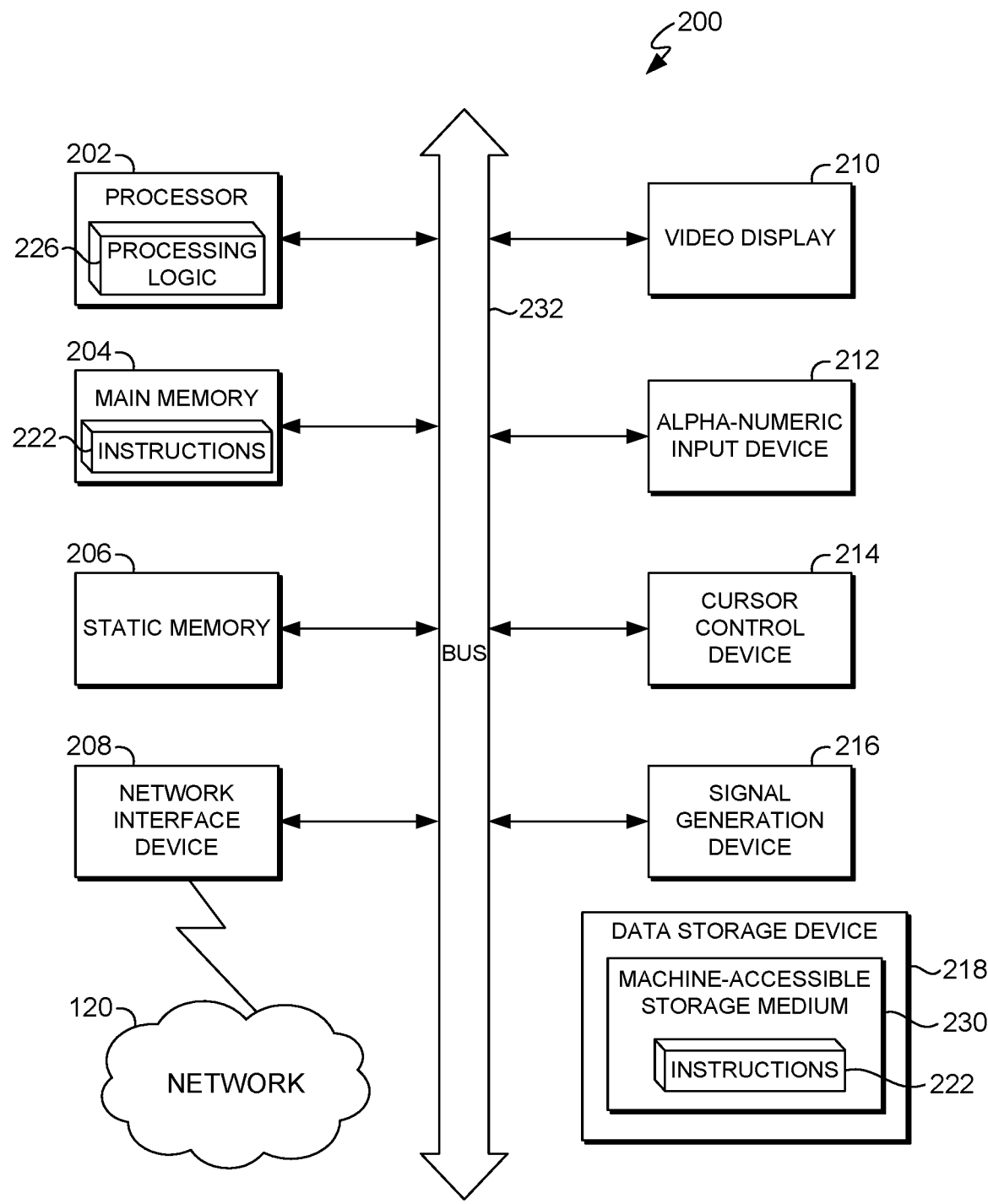
FIG. 2 is a schematic diagram of an embodiment of the locker exchange server of FIG. 1.

FIG. 2 illustrates a diagrammatic representation of an example computer architecture of the locker exchange server 200 of FIG. 1. This general computer architecture may also be used within the other computerized components of the item exchange system 110 shown in FIG. 1 (e.g., the mobile computing device 125, the one or more remote computing devices 130, the seller computer 135, the purchaser computer 140, and/or the respective internal computers 330 of the one or more locker banks 300).

The locker exchange server 200 may operate in the capacity of a server or a client computer in a client-server network environment, or as a peer computer in a peer-to-peer (or distributed) network environment. The locker exchange server 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken, throughout this specification, to include any collection of computers that individually or jointly execute a set (or multiple sets) of instructions to perform, for example, any one or more of the methodologies discussed herein.

In the embodiment shown in FIG. 2, the locker exchange server 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 302 may be configured to execute processing logic 226 for performing various operations and steps discussed herein.

The locker exchange server 200 may further include a network interface device 208. The locker exchange server 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-readable storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by the locker exchange server 200—main memory 204 and processing device 202 also constituting computer-accessible storage media. The software 222 may further be transmitted or received over a network 120 via the network interface device 208.

While the computer-readable storage medium 230 is shown in an exemplary embodiment to be a single medium, the terms "computer-readable storage medium" and "machine-accessible storage medium" and the like should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary Locker Bank

Figure 3:
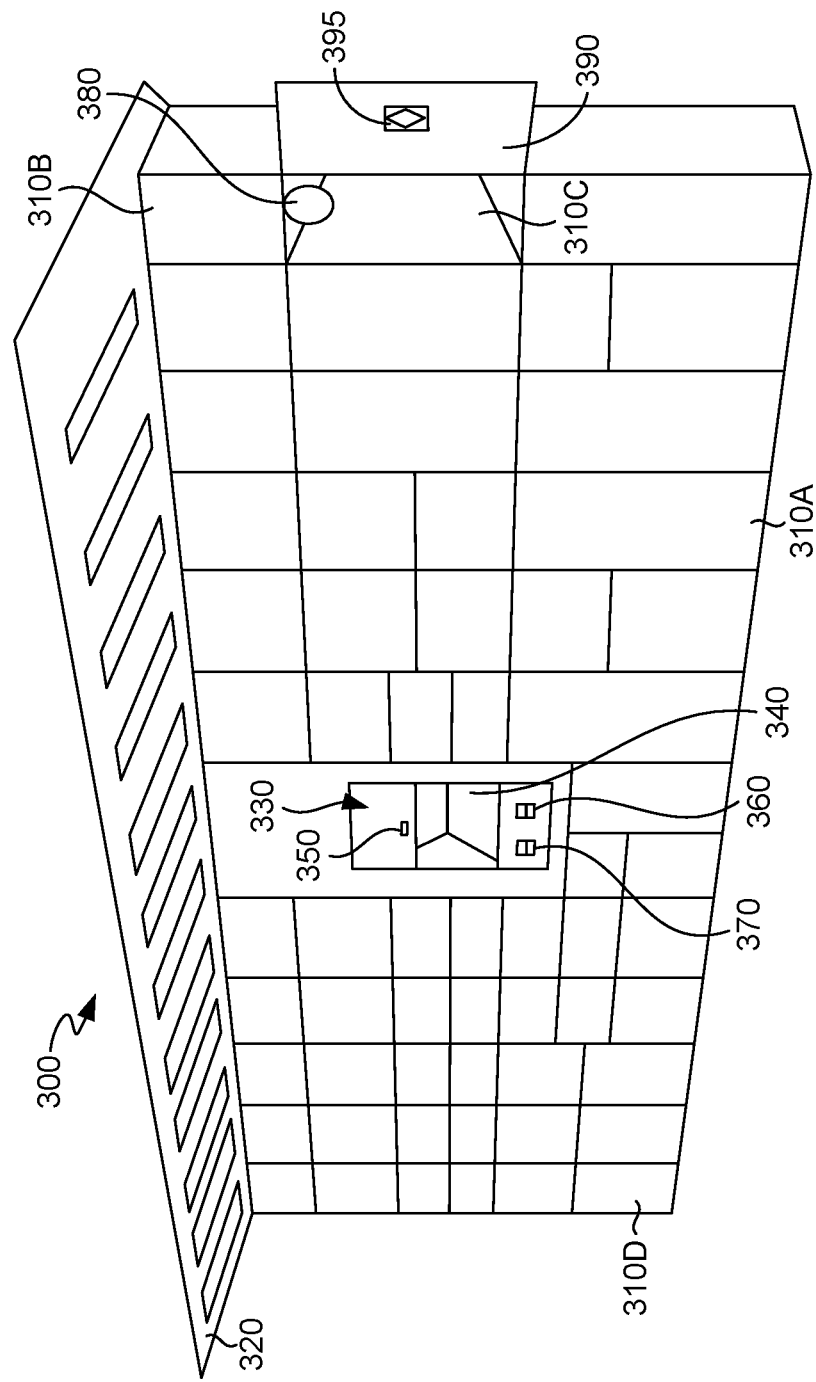
FIG. 3 is a perspective view of a locker bank according to a particular embodiment.

FIG. 3 depicts an exemplary locker bank 300 that may be used in implementing an exchange between a seller and a purchaser. As shown in this figure, a locker bank 300, according to a particular embodiment, comprises a plurality of lockers 310A-310D of varying sizes (e.g., small, medium, large, etc.). Each locker includes a housing defining an interior area dimensioned to receive an item for storage. A door is pivotably attached to an opening leading to the interior area. The locker bank 300 further comprises an optional awning 320 that extends outwardly from an upper portion of the locker bank 300 and may provide at least partial protection to users from various weather conditions such as rain, snow, wind, and sun when the users are placing parcels into the locker bank 300 and/or retrieving parcels from the locker bank 300. In the embodiment shown in FIG. 3, the locker bank 300 further comprises a locker bank computer 330 that users may use to facilitate the placement of one or more items into the locker bank 300 and/or the retrieval of one or more items from the locker bank 300, for example, in any manner described in this disclosure or in any other suitable manner. The locker bank computer 330, in a particular embodiment, comprises a touch-screen display 340, one or more imaging devices 350 (e.g., one or more cameras), a card reader 360, and a machine-readable indicia scanner 370 (e.g., a barcode scanner). In various embodiments, the operation of the locker bank 300 may be controlled by a remote computer system, a combination of a local and a remote computer system, or entirely by a local computer system.

In particular embodiments, the locker bank computer 330 may also be operatively coupled to one or more interior locker item imaging devices 380 (e.g., one or more cameras) that are located within the interior portion of one or more of the plurality of lockers 310A-310D. In particular embodiments, the one or more interior locker imaging devices 380 may include one or more flash devices for capturing images in dimly lit areas. In addition, in particular embodiments, one or more particular lockers of the plurality of lockers 310A-310D may include a computer-controlled, motorized, rotatable shelf (e.g., a Lazy Susan) that is mounted to rotate relative to the floor of the particular locker 310A-310D. The locker bank computer 330 may be adapted to selectively rotate this shelf when the item is disposed upon the shelf so that a user who is viewing multiple images (e.g., video images) captured by an imaging device 180 disposed within the particular locker 310A-310D will see the item positioned in different orientations relative to the camera. This may allow a user to view the item from different viewpoints. In particular embodiments, the system may be adapted to allow a user to remotely control the rotation of the rotatable shelf via, for example, a suitable computer application and/or remotely activate the imaging device 180. This may allow a user to gain an understanding of the condition of the item without having to, for example: (1) travel to the locker bank; or (2) provide any payment that may be necessary to gain access to the item from within the locker bank.

In various embodiments, the touch-screen display 340 may display instructions for a user. For example, the touch-screen display 340 may instruct the user on how to enter an access code, how to open and close the locker 310A-310D, how to lock and unlock the locker 310A-310D, etc.

In example embodiments, the locker bank 300 may include a point-of-sale (POS) system for accepting payment from users in the form of: (1) a cash transaction; (2) a credit or debit card transaction; (3) a gift certificate; (4) an electronic payment, such as payment by Google Pay, Apple Pay, PayPal, Bitcoin; and/or (5) any other suitable type of payment. In particular embodiments, the POS system may include, for example: (1) an electronic card reader; (2) a barcode scanner; (3) an automated cash payment system (such as those commonly used in conjunction with vending machines); (4) an NFC-enabled mobile payment system; and/or (5) any other suitable hardware for accepting payment from a user.

In a particular embodiment, the locker bank 300 comprises one or more secure lockers 310A-310D, made of a sufficiently strong material to prevent unwanted access to the interior of the lockers 310A-310D (e.g., a suitable metal such as steel plating, steel cage material, etc.). In various embodiments, the secure lockers of the locker bank 300 comprises any suitable number, size, shape, etc. For example, a particular locker bank 300 may include 25 secure lockers 310A-310D of varying sizes and shapes that are configured to hold a variety of different sized items.

In various embodiments, the arrangement of the secure lockers, bins, receptacles, and/or designated areas of the locker bank 300 may be any suitable arrangement. For example, a particular locker bank 300 may have all large lockers on the outer edges of the locker bank 300 with smaller lockers 310A-310D towards the center of the locker bank. In a particular embodiment, a locker bank 300 comprises a plurality of secure lockers 310A-310D that each comprise a respective enclosure (e.g., an enclosure that is substantially in the form of a rectangular prism or any other suitable shape) defining at least one opening. In various embodiments, the one or more lockers 310A-310D each comprise at least one door 190 adjacent the opening for selectively restricting access to the interior of the one or more lockers 310A-310D. In particular embodiments, the at least one door is positioned to selectively prevent access to the interior of the locker enclosure through the at least one opening when the at least one door is in a closed position. In various embodiments, the at least one door is configured, when in an open position, to provide access to the interior of the locker enclosure through the at least one opening.

In particular embodiments, at least one of the lockers 310A-310D within the locker bank 300 comprise at least one sensor adjacent and/or within its enclosure to sense the presence of an item within the enclosure. Suitable sensors include, for example, proximity sensors, weight sensors, LIDAR and other suitably positioned light sensors, or any other suitable sensor for sensing the presence of an item. In particular embodiments, the at least one sensor is in communication with the locker bank computer 330.

The one or more lockers 310A-310D further comprise at least one locking mechanism 395 for selectively maintaining the at least one door 390 in a closed position. In particular embodiments, the locking mechanism 395 is controlled by one or more locker bank computers 330, which may, for example, require an access code (e.g., a PIN, an alphanumeric code, QR code, linear barcode, Maxi code, etc.) in order to unlock any particular locker 310A-310D within the locker bank 300. The one or more locker bank computers 330 may control access to each of the one or more lockers 310A-310D within the locker bank 300. In particular embodiments, each particular locker 310A-310D within the locker bank 300 is controlled by a particular associated locker bank computer 330.

In various embodiments, the one or more locker bank computers 330 are configured to communicate automatically with a mobile computing device that is located within a predetermined distance of the locker bank 300. In some embodiments, the one or more locker bank computers 330 are configured to communicate automatically with one or more mobile computing devices simultaneously. Via the communication link, the mobile computing device may communicate relevant information such as a request to open a particular locker, identifying information for the user of the mobile computing device, a size of the one or more items the user requests to place within the locker bank 300, etc.

Exemplary System Platform

Various embodiments of a locker bank having a plurality of lockers and one or more computer systems for facilitating an exchange of items between users may be implemented on any suitable hardware and/or software platform or other suitable system. For example, particular embodiments may be implemented within the context of any suitable classified advertisement system (e.g., Craigslist) and/or a computerized locker system such as one offered by a common carrier (e.g., such as United Parcel Service of America, Inc. of Atlanta, Ga.) or other logistics services provider.

Various aspects of the item exchange system's functionality may be executed by certain system modules, including a Locker Reservation Module 400, a Locker Bank Operation Module 500, and an Item Return Processing Module 600, which may be executed individually or collectively, for example, by one or more of the one or more locker exchange servers 200 and/or one or more of the locker bank computers 330 of the one or more locker banks 300. These modules are discussed in greater detail below.

It should be understood that the functions described in connection with the different modules below do not have to be implemented in the module-type architecture described (e.g., the described computer functions do not have to be organized into modules). Rather, aspects of the invention are described in connection with this structure in order to facilitate understanding of the invention. It should also be understood that the functionality described below may be executed on a single computer, or that various functions may be executed by multiple different computers.

Additionally, although various steps and functions are described as occurring in response to another step, function, or triggering event, it should be understood that in various other embodiments, such functions or steps may occur in response to any other triggering functions or events; independent of any triggering functions or events; at least partially in response to any triggering functions or events; or in response to or at least partially in response to any combination of triggering functions, steps, events, etc. Although these exemplary modules are described as performing these functions in a particular order, it should be further understood that various other embodiments and implementations of these functions may occur in an order other than in which they are presented. Still other embodiments may omit particular steps or functions described below or perform additional steps or functions to those described.

A. Locker Reservation Module

Figure 4:
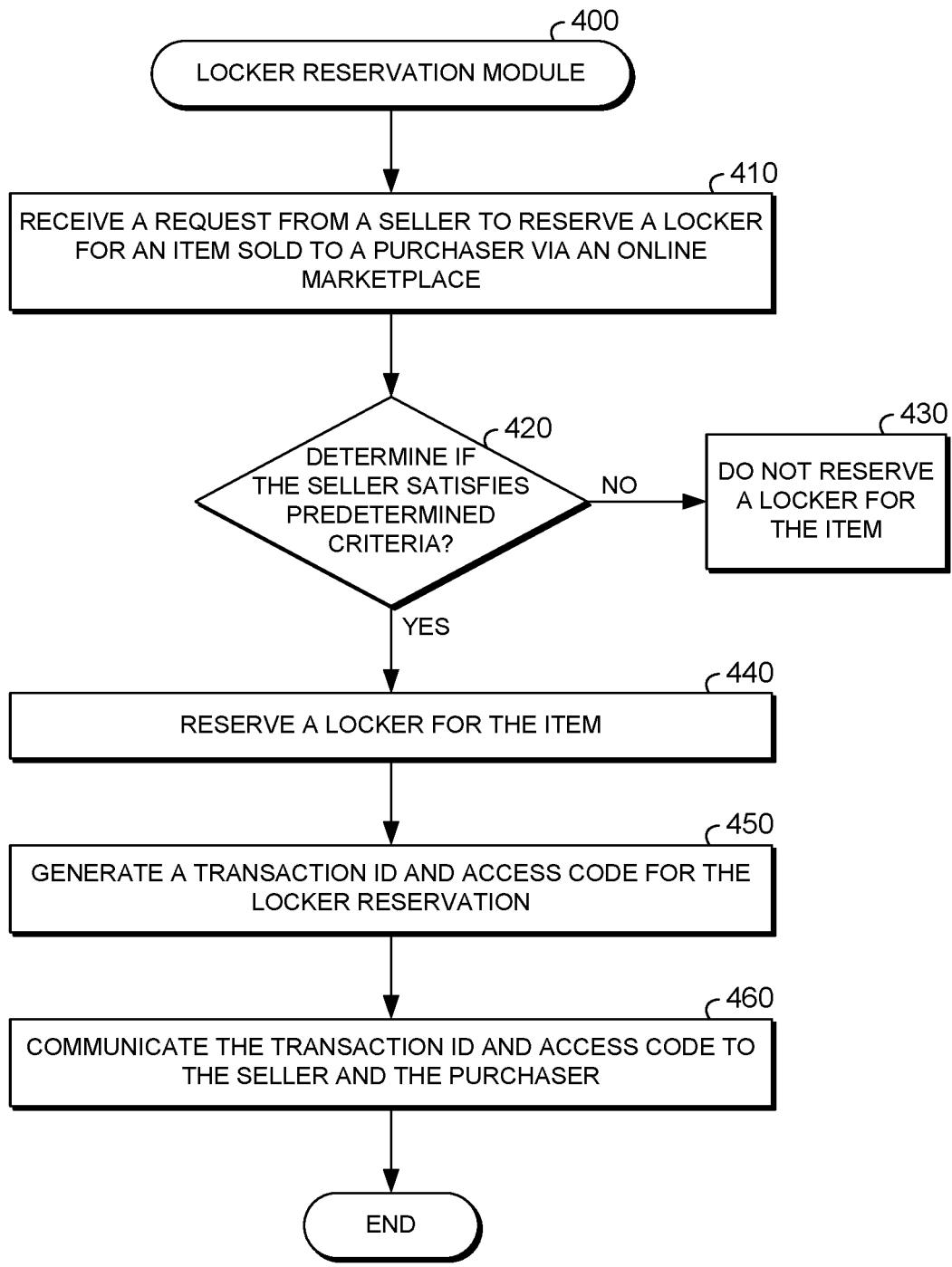
FIG. 4 depicts a flow chart that generally illustrates various steps executed by a Locker Reservation Module that, for example, may be executed by the locker exchange server of FIG. 1.

FIG. 4 is a flow chart of operations performed by an exemplary Locker Reservation Module 400, which, in the described embodiment, is executed by a suitable locker exchange server 200. It should be understood that the steps described below for the Locker Reservation Module 400 may be executed by one or more locker bank computers 330. In particular embodiments, the Locker Reservation Module 400 may facilitate arranging for storage of an item, sold by a seller to a purchaser, within a locker for later pickup by the purchaser. Various steps of an exemplary Locker Reservation Module 400 are described below.

I. Receive a Request from a Seller to Reserve a Locker for an Item Sold to a Purchaser Referring to FIG. 4, when executing the Locker Reservation Module 400, the locker exchange server 200 begins, in various embodiments, at Step 410, by receiving, from a seller, a request to reserve a locker for an item sold to a purchaser via, for example, an online or traditional marketplace. In various embodiments, the seller and purchaser may have agreed that the purchaser will purchase the item from the seller. For example, the seller and purchaser may have agreed that the purchaser would purchase the item from the seller after the purchaser responded to a classified advertisement for the item posted by the seller in a classified advertisement (e.g., a paper or on-line classified advertisement, etc.) The purchaser and seller may have reached the agreement, for example, when the purchaser contacted the seller regarding the advertisement (e.g., via text message, e-mail, telephone, etc.). After agreeing on the purchase of the item, the purchaser and seller may have further agreed to exchange the item (e.g., and payment for the item) via a locker bank 300, such as any suitable locker bank 300 described herein.

The seller and purchaser may identify an appropriate locker bank 300 for the exchange of an item in any suitable manner. For example, (1) they may agree to exchange the item at any locker bank 300 that is determined (e.g., automatically by the locker exchange server 200 or manually by the buyer or seller) to be available within a specified geographic area (e.g., within a particular zip code, adjacent a particular landmark, within a particular city, within a specified threshold distance of the seller and/or purchaser's home or business); (2) they may agree on a particular locker bank location that they both are aware of; (3) one or both of the seller and buyer may access the locker exchange system to identify lockers available in a particular geographic area and come to an agreement on a particular locker bank location for the exchange; and (4) if the transaction is conducted online, a computer system associated with an online marketplace used to facilitate the transaction may connect with particular locker banks to identify available locker banks for selection. For example, the Locker Reservation Module 400 may request a geographic location from both the seller and the purchaser (e.g., an address or GPS location of their mobile computing devices) and identify one or more locker banks equidistance from the two locations. In other embodiments, the Locker Reservation Module 400 may request the seller and purchaser to provide maximum travel distances (e.g., distances the party is willing to travel) and identify locker banks within those criteria. If no locker banks are identified, the Locker Reservation Module 400 may request the purchaser and seller to increase their maximum travel distances or provide a listing of locker banks that are proximate the maximum distances.

In other embodiments, the locker exchange server 200 may receive a request to reserve a locker from a mobile computing device or other computing device associated with the seller. In such embodiments, the locker exchange server 200 may receive the request to reserve a locker 310A-310D at a particular locker bank 300 at some point in time between when the seller and purchaser have agreed on the sale of the item and when the seller arrives at the locker bank 300 to deposit the item in the locker. The seller may, for example, reserve or request the locker before physically arriving at the locker bank 300. For example, the seller may use an application on the user's mobile computing device to reserve a locker at a particular locker bank 300. The application, in such embodiments, may cause the user's mobile computing device to transmit a request to the locker exchange server 200 to reserve a locker at the particular locker bank 300. In various embodiments, the reservation (e.g., or the request) may include a reservation or request for a locker of at least a particular size, a reservation or request for a specific locker, or a reservation or request for any available locker at the locker bank 300.

In various embodiments, the application described above (which may, for example, execute on the user's mobile computing device) is in communication with the locker exchange server 200. In particular embodiments, the application is adapted to display a digital map identifying locker banks 300 with available capacity for selection by the seller. In particular embodiments, the application may use the geolocation of the seller's mobile computing device, in combination with locker availability information obtained from the locker exchange server 200, to determine which locker banks 300 to display based, for example, on the current or forecast future availability of the various lockers within the locker banks 300. Various ways to reserve locker space as well as to predict and determine capacity of lockers and locker banks are explained in U.S. patent application Ser. No. 15/608,781, entitled Mobile Locker Bank Systems and Methods, filed on May 30, 2017; U.S. patent application Ser. No. 14/200,724, entitled Systems and Methods for Returning Items to Attended Delivery/Pickup Locations, filed on Mar. 7, 2014; and U.S. Patent Application No. 62/441,832, entitled Computerized Locker Banks with Enhanced Forecasting Capabilities, filed on Jan. 3, 2017, the entire disclosure of all applications being incorporated by reference herein.

In various embodiments, the locker exchange server 200 may receive the request to reserve a locker (e.g., automatically or non-automatically) in response to the seller selling the item on the online marketplace (e.g., in response to a seller indicating that a sale of the item has been agreed upon with a purchaser based on the listing). For example, the seller may elect, when listing the item, to only allow for locker delivery of the item. In such embodiments, once the sale has been made, the locker exchange server 200 may automatically reserve a locker for the item in accordance with the seller's instructions. These instructions may include, for example: (1) instructions related to a location of the locker bank 300 (e.g., the seller may list the locker bank 300 at which any exchange would occur as part of the listing); (2) instructions related to a size of the item; and/or (3) instructions related to payment for the item by a purchaser (e.g., the seller's bank details or preferred payment option for transfer of funds when the purchaser uses the locker bank 300 account as a point of sale location for payment of the item when picking the item up). In various embodiments, when automatically reserving a locker for the item, the locker exchange server 200 may make the reservation based at least in part on the instructions (e.g., which the seller may have provided as part of the listing, or as default instructions for all sales made through a particular online classified advertisement website, etc.)

As another example, after the seller and purchaser agree that the purchaser will purchase a particular item on a particular website (e.g., an online classifieds website, such as www.craigslist.com, or an on-line auction website, such as eBay), the website may provide the seller and/or purchaser with the option of handling the exchange of the item via a suitable locker. In various embodiments, the particular website is in communication with the locker exchange server 200 (e.g., via a suitable API), which may provide locker bank availability information and the ability to select a suitable locker as described elsewhere herein, and which may communicate with the locker exchange server 200 to facilitate an exchange of the item at an appropriate locker bank 300 (e.g., by reserving a locker at the locker bank 300 for the exchange (e.g., for a particular date/time or date/time window), or by scheduling the exchange at the locker bank 300 (for a particular date/time or date/time window)).

In various embodiments, the purchaser may pay for the item prior to the seller requesting to reserve a locker. In other embodiments, the purchaser may elect to pay for the item at a later time, e.g., at the locker bank 300 once the seller has delivered the item to the locker bank 300 and the purchaser has inspected the item, as will be discussed further below.

II. Determine if the Seller Satisfies One or More Predetermined Criteria

The locker exchange server 200 continues, at Step 420 (which may be optional), by determining if the seller satisfies one or more predetermined criteria. In particular embodiments, if the seller does not satisfy the one or more predetermined criteria, the locker exchange server 200 does not reserve a locker for the seller. In other embodiments, if the seller does satisfy the one or more predetermined criteria, the locker exchange server 200 reserves a locker for the item, as discussed below.

In various embodiments, the one or more predetermined criteria may be any suitable criteria. In particular embodiments, the one or more predetermined criteria may be based on: (1) past customer satisfaction with the particular seller; (2) past return rates for the particular seller; and/or (3) whether a particular seller has been indicated to be reliable based on data regarding the seller's past transactions with a logistics service provider (e.g., the volume of parcels sent or received by the seller over a particular period of time, the amount of time that the particular seller has been at a particular location, etc.) For these cases, a threshold may be established to satisfy the criteria (e.g., minimum score on a customer satisfaction rating system, maximum return rates, or minimum volume of parcels). In particular embodiments, the locker exchange server 200 may require the seller to maintain minimal insurance coverage to protect against transactions that are not completed as agreed.

As noted above, in some embodiments, the one or more predetermined criteria may be based on whether the seller has been preapproved by the locker exchange server 200 as a "trusted seller". In particular embodiments, the locker exchange server 200 may determine whether a particular seller is a trusted seller based, for example, on a logistics service provider's past experience with the seller (e.g., as a seller through the described item exchange process and/or in the seller's past role as a shipper of items.) Any suitable rating system may be used in evaluating the seller as a trusted seller. For example, past purchasers may be asked to rate a past sale transaction with the seller on a predetermined numerical scale (e.g., on a scale of 1-10) and the shipper may receive a trusted seller designation only if they receive an average rating above a pre-determined threshold score. Similarly, a seller may be rated, at least in part, on: (1) the volume of packages that the seller ships with a particular logistics service provider (e.g., a particular common carrier); (2) the seller's payment history with a logistics service provider; and/or (3) any other suitable factor.

III. Reserve a Locker for the Item

At Step 430, at least partially in response to determining that the seller satisfies the one or more predetermined criteria, the locker exchange server 200 may optionally reserve a locker for the item. In some embodiments, the locker exchange server 200 may reserve a particular locker for the item. In other embodiments, the locker exchange server 200 may generally reserve a particular size of locker for the item (e.g., the system may specify that a particular size of locker must be made available at the specified day/time or day/time window, but not specify the particular locker that must be available).

In some embodiments, the locker exchange server 200 may allow the user to select a particular locker within a locker bank 300 for storing the item. For example, for a seller familiar with the layout of the lockers within the locker bank 300, the seller may prefer to reserve space near the computer of the locker bank 300. In various embodiments, the locker exchange server 200 may provide the seller with a diagram of the locker bank 300 and display to the seller available lockers for the seller to select to reserve. In some embodiments, the available lockers may be color-coded within the diagram (e.g., available lockers may be displayed, on a display screen, as green while unavailable lockers may be displayed as red).

According to various embodiments, the locker exchange server 200 may reserve the locker for the item after the purchaser agrees to purchase an item. In some embodiments, the locker exchange server 200 may reserve the locker for a particular period of time. For example, the locker exchange server 200 may reserve the locker for the item for 24 hours and if the item is not deposited into the locker within that timeframe, the locker exchange server 200 may cancel the reservation of the locker. In various embodiments, the length of time that the locker exchange server 200 reserves the locker may be based on the one or more predetermined criteria required to reserve the locker. For example, a seller that has a rating above a first pre-determined threshold on a third party rating service may be able to reserve a locker for a longer period of time than a seller who has a rating that is below a second pre-determined threshold.

In various embodiments, in reserving a locker for the item, the locker exchange server 200 sends an indication to the locker bank computer 330 informing the locker bank computer 330 to expect an item to be deposited by the seller. In such embodiments, the locker exchange server 200 may update a future availability of lockers at the locker bank 300 by removing a locker 310A-310D from a listing or inventory of available lockers 310A-310D.

In alternative embodiments, the locker exchange server 200 may not formally reserve a locker for the item. Instead, for example, the locker exchange server 200 may store, in memory, an indication that the item will be delivered to the locker bank 300 within a particular time window on a particular date, but the locker exchange server 200 may not preclude others from utilizing the locker prior to the seller arriving at the locker bank 300 to deposit the item. For example, if a locker bank 300 has ten total lockers and a seller has requested that a locker be available prior to arriving at the locker bank 300, it may, in various embodiments, be possible that the seller may arrive at the locker bank 300 and find that all ten lockers in the locker bank 300 are occupied by other items (e.g., parcels, items for sale, etc.). In such an instance, the seller may be unable to deposit the item due to the lack of availability. In this example, system transmits an indication to the locker bank computer 330 to expect the item, but does not include specifically reserving a locker in a manner that would preclude another (e.g., a different seller) from using a last available locker if that seller arrived at the locker bank 300 prior to the seller using the locker exchange server 200 to arrange for an exchange to be made at the locker bank 300 within a particular time window on a particular day.

IV. Generate a Transaction ID and Access Code for the Locker Reservation

Next, at Step 440, the locker exchange server 200 generates a transaction ID and/or an access code for use in accessing the locker. In other embodiments, the locker exchange server 200 may receive the transaction ID and/or access code from another source, such as an online marketplace that is used to broker the sale of the item and/or from the seller or purchaser. In various embodiments, the transaction ID may also include identifying information for the transaction that has taken place between the seller and the purchaser. For example, the transaction ID may include one or more of the names of the parties (e.g., the seller and/or the purchaser), the description of the item sold, and/or the size of the item sold, the cost of the item sold, the agreed to terms of the transaction, etc. In further embodiments, the transaction ID may be a numeric or alphanumeric code that links to the associated transaction record.

In particular embodiments, the access code may be any suitable code for gaining access to a particular locker located within a particular locker bank 300. For example, the access code may be any suitable series of numbers, letters, words, etc. which may be manually entered into the locker computer using the touch-screen to gain access to the reserved locker. In some embodiments, the access code may be a machine-readable code (e.g., a linear barcode, QR code, etc.) that is sent to the seller's mobile computing device. In various embodiments, the user may present the code displayed on the seller's mobile computing device to the locker system's scanner to gain access to a particular locker using the locker bank computer 330. Alternatively, the seller may print a machine-readable indicia, such as a bar code (e.g., a linear bar code or QR code) and present that printed code to the scanner to gain access to the locker. In further embodiments, the access code may be communicated to the locker bank computer 330 using near-field communication or other wireless communication protocols.

V. Communicate the Transaction ID and Access Code to the Seller and the Purchaser Continuing to Step 450, the locker exchange server 200 communicates the transaction ID to the seller and the purchaser. Additionally, the locker exchange server 200 also communicates an access code to the seller and/or a logistics service provider that is engaged to deliver the item to the locker bank 300 on behalf of the seller. In particular embodiments, in response to the seller (or third party) (1) delivering the item to the locker bank 300, (2) using the access code to access a suitable locker for the item, (3) inserting the item into the suitable locker bank 300, and (4) locking the locker bank's door, the locker exchange server 200 sends a second access code to the purchaser along with a notification that the item has been delivered to the locker bank 300. The purchaser may then use this second access code to access the item (e.g., after paying for the item). It should be understood that, although the locker exchange server 200 is described above as transmitting the second access code to the purchaser in response to the item being deposited in the locker, the second access code may be sent to the purchaser at any other suitable time. For example, the access code may be sent proximate the time the first access code is sent to the seller/logistics service provider. In this case, the locker exchange server 200 may still send a notification to the purchaser after the item has been locked into a locker at the locker bank.

In various embodiments, the locker exchange server 200 may communicate the transaction ID and the access code to the seller and the purchaser via any suitable communication means. For example, the communication to the seller and the purchaser may be via email, text message, telephone call, voicemail, electronic notification, pop-up message on a web browser, notification on a mobile computing device application, etc. In some embodiments, the locker exchange server 200 may require the seller and/or purchaser to sign into an account on an associated website to retrieve the transaction ID and/or access code. In still other embodiments, the locker exchange server 200 may allow the seller and/or the purchaser to select a particular access code. For example, the locker exchange server 200 may allow the seller to enter a particular alphanumeric combination to be used as an access code for gaining access to a locker. In some embodiments, the locker exchange server 200 may allow the seller to use the same access code for each locker reservation that the seller makes with a particular locker bank 300. In other embodiments, the locker exchange server 200 may require a unique access code each time the seller makes a reservation for a locker within a particular locker bank 300.

B. Locker Bank Operation Module

Figure 5:
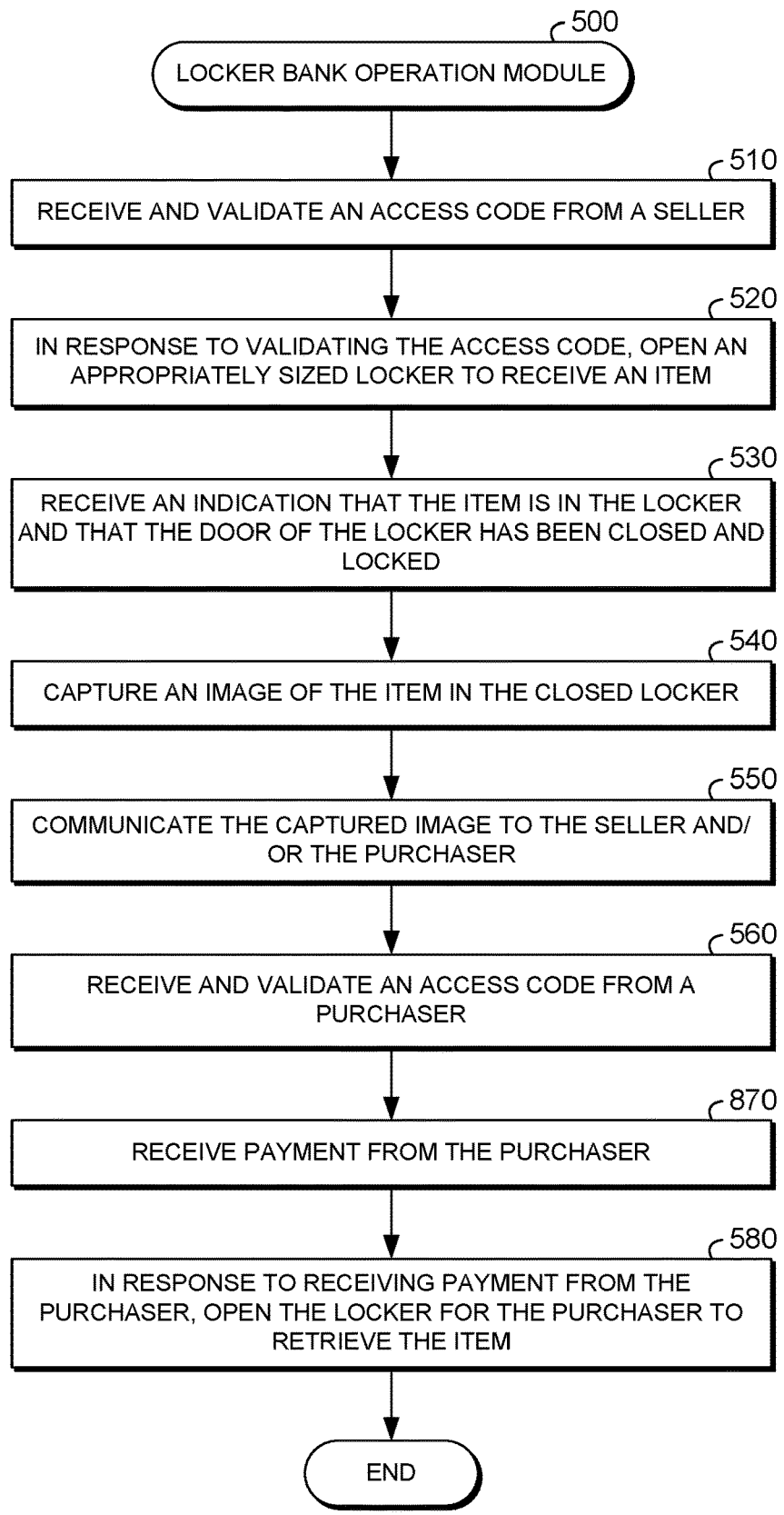
FIG. 5 depicts a flow chart that generally illustrates various steps executed by a Locker Bank Operation Module that, for example, may be executed by the locker exchange server of FIG. 1.

FIG. 5 is a flow chart of operations performed by an exemplary Locker Bank Operation Module 500, which, in the example below, is executed by the system's locker exchange server 200 working in conjunction with a suitable locker bank 300. As noted above, however, in other embodiments, one or more of the steps of the locker bank 300 operation module 500 may be executed, alone or collectively, by any other suitable components of the item exchange system 110.

In particular embodiments, the Locker Bank Operation Module 500 may facilitate the opening of a particular locker for placement by a seller and retrieval by a purchaser of an item purchased using an online marketplace. Various steps of an exemplary Locker Bank Operation Module 500, as executed by various components of the item exchange system 110, are described below. Although these steps are discussed in a particular order, it should be understood that particular embodiments of a Locker Bank Operation Module 500 may include one or more additional steps to those described, may omit one or more of the described steps, or may perform any of the steps in an order other than which they are presented.

As noted above, it should be understood that the functions described in connection with the different modules described herein do not have to be implemented in the module-type architecture described (e.g., the described computer functions do not have to be organized into modules). Rather, aspects of the invention are described in connection with this structure in order to facilitate understanding of the invention. It should also be understood that the functionality described below may be executed on a single computer, or that various functions may be executed by multiple different computers.

I. Receive and Validate an Access Code from a Seller

Referring to FIG. 5, when executing the Locker Bank Operation Module 500, the item exchange system 110 begins, at Step 510, by using the locker exchange server 200 to receive and validate an access code from a seller. In particular embodiments, the locker exchange server 200 may receive and validate an access code from the seller by comparing the received access code against the access code generated in connection with reserving a locker. In various embodiments, the locker exchange server 200 may receive the access code from a mobile computing device associated with the seller (e.g., while the mobile communication device is wirelessly communicating with the locker bank computer 330 from a position near to the locker bank computer 330). In some embodiments, the mobile computing device communicates the access code to the locker bank computer 330, which then communicates the received access code to the locker exchange server 200. In other embodiments, the mobile computing device communicates the access code directly to the locker exchange server 200. For example, in various embodiments in which the item exchange system 110 is configured to enable wireless communication between the seller's mobile computing device and the locker bank computer 330, the item exchange system 110 may automatically open a wireless communication channel between the mobile computing device 125 and the locker bank computer 330 in response to determining that the mobile computing device 125 is within a particular distance of the locker bank computer 330 (e.g., based on a GPS location of the mobile computing device 125, NFC or Bluetooth communications between the mobile computing device 125 and the locker bank computer 330 or another suitable computer, or any other suitable technique).

In some embodiments, the item exchange system 110 (e.g., the locker exchange server 200 and/or the locker bank computer 330) may receive the access code from input received on an input device associated with the locker bank computer 330 (e.g., such as a touch-screen display). In various embodiments, the item exchange system 110 may receive identifying information in addition to the access code. For example, the item exchange system 110 may require the seller to input information about the seller, the item, the purchaser, the transaction details, cost of the item, etc.

In various embodiments, the item exchange system 110 may validate the access code from the seller in any suitable manner. For example, the item exchange system 110 may receive the access code locally (e.g., at the locker bank computer 330) and validate the access code by transmitting the access code over the one or more networks 120 to the locker exchange server 200, which then validates the access code from a location that is remote from the locker bank 300. In some embodiments, the item exchange system 110 may receive the access code locally (e.g., at the locker bank computer 330) and validate the access code locally, at the locker bank computer 330. In other embodiments, the item exchange system 110 may receive the access code via the Internet or a cellular network and validate the access code at a computer that is remote from the locker bank (e.g., at the locker exchange server 200).

In various embodiments, the item exchange system 110 may receive the access code from any suitable user. For example, in instances where the seller elects to have a logistics service provider deliver the item to the locker, the seller may provide the logistics service provider with the access code for use in depositing the item. In some embodiments, the seller may request that a third party deliver the item to the locker (e.g., a friend, neighbor, family member, etc.).

In various embodiments, the item exchange system 110 may use further authentication methods to validate the access code. For example, the system may require authentication of the seller via an identification card (e.g., a government-issued ID) associated with the seller, using a biometric scan, etc. Suitable systems and methods that may be used for confirming the identity of a seller or buyer at a locker bank are described in detail in U.S. patent application Ser. No. 14/514,276, which was filed on Oct. 14, 2014 and entitled "Systems and Methods for Confirming an Identity of an Individual, for example, at a Locker Bank", and which is hereby incorporated herein by reference in its entirety.

II. In Response to Validating the Access Code, Open an Appropriately Sized Locker to Receive an Item At Step 520, in response to the item exchange system 110 validating the access code, the locker bank computer 330, in particular embodiments, opens an appropriately-sized locker to receive an item. In various embodiments, the locker bank computer 330 opens an appropriately sized locker that is an available locker that is not currently housing another item. In particular embodiments, the locker bank computer 330 may automatically open a locker that is closest to the minimum sized locker needed by the particular item. In other embodiments, the locker bank computer 330 may open a locker that is sized larger than the minimum sized locker needed to allow for easy placement into and retrieval of the item from the locker. Suitable systems and methods that may be used for facilitating the opening of an appropriately sized locker at a locker bank are described in detail in U.S. patent application Ser. No. 14/514,155, which was filed on Oct. 14, 2014 and entitled "Systems and Methods for Facilitating Delivery of a Parcel to Suitably-Sized Locker", and which is hereby incorporated herein by reference in its entirety. In some embodiments, the item exchange system 110 compares the dimensions of the item taken from information associated with the transaction ID against the dimensions of the available lockers.

In various embodiments, the item exchange system 110 may automatically open an available locker using the locker bank computer 330, which is configured to control access to each particular locker 310A-310D in the locker bank 300, for example, via one or more locking mechanisms associated with each particular locker. In particular embodiments, the locker bank computer 330 is configured to automatically open the available locker by unlocking a locking mechanism associated with the available locker 310A-310D. In various embodiments, each locker 310A 310D may be equipped with one or more indicators (e.g., one or more indicators for each particular locker) that are configured to indicate when a particular locker in the locker bank 300 is unlocked. For example, each particular locker may have an associated indicator light proximate the particular locker that the system is configured to turn on when the locker is unlocked. In various embodiments, the indicator may be color-coded to allow the seller to easily determine which locker has been unlocked. For example, while other lockers are displaying a red indicator, the locker bank computer 330 may cause a green indicator to be displayed on the locker opened for the seller.

In various embodiments, the locker bank computer 330 may automatically open two or more available lockers 310A-310D. In particular embodiments, the locker bank computer 330 may automatically open a locker 310A-310D of a first size that is at least the minimum locker size and a locker 310A-310D of a second size larger than the first size that is also at least the minimum locker size. In some embodiments, the system may automatically open two or more lockers 310A-310D, having different sizes, and allow the seller to place the item into any of the open lockers 310A 310D. In further embodiments, the locker bank computer 330 may open a locker of each available size (e.g., small, medium, large and extra-large) that has capacity and allow the seller to place the item in an appropriate locate (e.g., a locker of sufficient size to house the item).

In particular embodiments, after the locker bank computer 330 has automatically opened the appropriately sized locker 310A-310D, the locker bank computer 330 may alert the seller to close the locker 310A-310D once the item has been placed inside the locker 310A-310D.

III. Receive an Indication that the Item is in the Locker and that the Door of the Locker has been Closed and Locked Next, at Step 530, the locker bank computer 330 receives an indication that the item is in the locker 310A-310D and that the door of the locker 310A-310D has been closed and locked. In various embodiments, the locker bank computer 330 may receive an indication that the item is in the locker by using one or more suitable item sensors located within the locker 310A-310D to determine that an item has been placed within the locker 310A-310D (e.g., mechanical proximity sensors, photoelectric sensors, LIDAR, ultrasonic). In other embodiments, the system may require the seller to notify the system that the item has been placed within the locker 310A-310D either via the locker bank computer 330 and/or via the seller's mobile computing device 125. In some embodiments, the system may capture one or more images of the interior of the locker 310A-310D to determine that an item has been placed within the locker 310A-310D.

In various embodiments, the locker bank computer 330 may receive the indication that the door 390 of the locker 310A-310D has been closed in any suitable manner. For example, the locker bank computer 330 may use one or more sensors, may receive an indication from the seller's mobile computing device 125, may receive an input at the locker bank computer 330, etc. to determine that the locker door 390 has been closed. In some embodiments, the locker bank computer 330 may automatically lock the locker in response to determining that the door 390 of the locker 310A 310D has been moved from an open position to a closed position. In other embodiments, the locker bank computer 330 may require the seller to provide an indication on the locker bank computer 330 to lock the locker 310A-310D.

In various embodiments, in response to receiving the indication that the item is in the locker 310A-310D and the door of the locker 310A-310D is closed and locked, the locker bank computer 330 may associate the item with the locker 310A 310D in memory. In such embodiments, the locker bank computer 330 may further associate the locker 310A-310D with the access code provided to the purchaser as described above. In various embodiments, the locker exchange server 200 is configured to transmit an indication to the purchaser that the item has been deposited in the locker 310A-310D.

IV. Capture an Image of the Item in the Closed Locker

Continuing to Step 540, the locker bank computer 330 captures an image of the item. In some embodiments, the locker bank computer 330 may prompt the seller to capture one or more images of the item prior to placing the item within the locker 310A 310D. For example, the locker bank computer 330 may instruct the seller to capture one or more images of the item by using an imaging device 150, such as the one described in reference to FIG. 3, and/or by using the seller's mobile computing device 125 to capture an image of the item. In various embodiments, the locker bank computer 330 may provide the seller with instructions via the locker bank display screen 340 on different angles from which to capture the one or more images. In cases where the image is captured by the seller's mobile computing device 125, the images may be uploaded from the seller's mobile computing device 125 to the locker bank computer 330 by a wireless computer link.

In particular embodiments, the locker bank computer 330 captures one or more images of the item after the item has been placed into the locker and the door closed. In various embodiments, the individual lockers may include a light source (not shown)(e.g., flash, LED) to illuminate the item to facilitate the capture of images. In particular embodiments, the locker bank computer 330 may capture the image of the item using the one or more interior locker imaging devices 180 located within the particular locker 310A-310D. In particular embodiments, the locker bank computer 330 may capture the image of the item before and/or after the locker 310A-310D has been closed and/or locked. In various embodiments, the locker bank computer 330 saves the captured image to memory and/or the locker bank computer 330 may transmit the images to the locker exchange server 200 which saves the captured image to memory.

In various embodiments, the locker bank 300 comprises a mechanism for adjusting a position of the item within the locker (e.g., a motorized turntable, such as a Lazy Susan, disposed proximate/adjacent a floor surface of the interior storage portion of the locker 310A-310D, etc.) so that the locker bank computer 330 can capture one or more images of the item from one or more different angles using one or more fixed imaging devices (e.g., cameras) within the locker 310A-310D. In other embodiments, the one or more imaging devices within the locker 310A-310D are mounted on a mechanism (e.g., a swivel, articulating arm, a slideable mount for the camera) for moving the one or more imaging devices within the locker (e.g., relative to the item) in order to capture the one or more images of the item from a plurality of different angles. In various embodiments, the locker bank computer 330 saves the captured image to memory and/or the locker bank computer 330 may transmit the images to the locker exchange server 200 which saves the captured image to memory.

In other embodiments, the locker bank computer 330 is configured to capture one or more videos of the item. In such embodiments, the locker bank computer 330 may, for example, be configured to take one or more videos as the seller places the item in the locker 310A-310D (e.g., the system may be configured to record video using the interior locker imaging device from a time at which the locker bank computer 330 opens the locker 310A-310D until the time at which the system receives the indication that the item is in the locker 310A-310D and that the door of the locker 310A-310D has been closed and locked). In various embodiments, the locker bank computer 330 saves the captured video to memory.

V. Communicate the Captured Image to the Seller and/or the Purchaser

At Step 550, the locker exchange server 200 communicates the captured image to the seller and/or the purchaser. In various embodiments, the locker exchange server 200 may communicate the captured image to only the seller or the purchaser. In particular embodiments, the locker exchange server 200 may communicate the captured image to the seller and/or the purchaser automatically after the image is captured. In some embodiments, the locker exchange server 200 may communicate the captured image to the seller and/or the purchaser in any suitable manner. For example, the locker exchange server 200 may communicate with the locker bank computer 330 to initiate a display, by the locker bank computer 330, of the captured image to the seller on the locker bank's touchscreen 340, email the image to the seller and/or the purchaser, text the image to the seller and/or purchaser, provide a notification that the image may be viewed within a particular application, etc. Where the images are stored locally at the locker bank computer 330, the locker bank computer may initiate a display of the images independent of the locker exchange server 200. In other embodiments, the locker exchange server 200 may transmit the one or more images (e.g., or videos) to a purchaser computer 140 (e.g., via a suitable software application) and/or mobile computing device 125 associated with the purchaser.

In particular embodiments, after the image of the item is captured and displayed and/or transmitted to the seller, the locker bank computer 330 may provide the seller with an opportunity to either accept the image or have the imaging device retake an image of the item. This may help to assure that the locker bank computer 330 captures a suitable image of the item. In various embodiments, the acceptance of the image(s) may occur prior to transmitting the images to the purchaser.

In various embodiments, the locker exchange server 200 may communicate the captured image to the purchaser in order to confirm that the item is acceptable to the purchaser prior to the purchaser arriving at the locker bank 300 to retrieve the item. In some embodiments, the image is communicated to the purchaser (e.g., via email, SMS, website posting, etc.) and the purchaser is given the opportunity to accept the item or reject the item. For example, if the captured image is different from what the seller advertised online, the purchaser may be able to save a trip to the locker bank 300 by viewing the captured image and notifying the seller and/or the locker exchange server 200 that the item is not acceptable to the purchaser. In other embodiments, the image may be presented to the purchaser at the locker bank 300 and the purchaser given the opportunity to accept the item or reject the item.

VI. Receive and Validate an Access Code from a Purchaser

At Step 560, the locker exchange server 200 receives and validates an access code from a purchaser. This step is similar to Step 510 described above. As may be understood from this disclosure, after the seller has placed the item in the locker 310A 310D (and, optionally, after the purchaser has confirmed the acceptability of the item by viewing the one or more images), the purchaser may travel to the locker bank 300 to complete the transaction with the seller (e.g., by paying for the item and retrieving the item).

For purposes of ease of understanding and clarity, only certain aspects will be discussed to highlight the differences between Step 560 and Step 510. For example, rather than receiving and validating an access code from the seller, the access code is received from a purchaser and validated. In various embodiments, the access code from the purchaser may be the same access code received from the seller. In other embodiments, the access code from the purchaser may be a different access code than that which was received from the seller. As discussed above, the processes for receiving and validating the access code are similar for receiving and validating the access code for the purchaser as they are for the seller.

It should be understood that, in various embodiments, this step may further comprise validating the identity of the individual who is present at the locker bank 300 as an individual who is approved to retrieve the item from the locker bank 300. As noted above, suitable systems and methods that may be used for confirming the identity of a seller or buyer at a locker bank are described in detail in U.S. patent application Ser. No. 14/514,276, which was filed on Oct. 14, 2014 and entitled "Systems and Methods for Confirming an Identity of an Individual, for example, at a Locker Bank", and which is incorporated herein by reference in its entirety.

VII. Receive Payment from the Purchaser

At Step 570, the item exchange system 110 receives payment from the purchaser. In particular embodiments, the system may receive payment from the purchaser at the time the purchaser retrieves the item from the locker. For example, the locker bank computer 330 may prompt the purchaser to input payment information prior to opening the appropriate locker 310A-310D to retrieve the item. In particular embodiments, the locker bank computer 330 may receive the payment from the purchaser in any suitable manner. For example, the locker bank computer 330 may receive the payment from the purchaser by: (1) having the purchaser swipe a credit card through a magnetic reader associated with the locker bank computer 330; (2) having the purchaser insert cash into an automated cash exchange associated with the locker bank 300; and/or (3) having the purchaser enter online account information using the locker bank computer's input device (e.g., touchscreen display), etc. In various embodiments, the locker bank computer 330 may receive the payment from the purchaser via any suitable payment type (e.g., cash, credit card, money order, debit card, electronic wire transfer, gift certificate, electronic bank transfer, bit coin, via an electronic account such as the purchaser's PayPal, Google Wallet, or Apple Pay account, etc.). In various embodiments, the locker exchange server 200 and/or locker bank computer 330 may then facilitate a transfer of the payment to the seller (e.g., a suitable account associated with the seller such a bank or other payment account).

In particular embodiments, for instance when the system receives payment from the purchaser via credit card, the system may require further identification from the purchaser. For example, the system may require the purchaser to enter a zip code associated with the purchaser's credit card. In some embodiments, the system may require even further identification from the purchaser to complete the transaction (e.g., confirming the purchaser's identity based on a government-issued ID card, telephone number, geographic location history, current location of the purchaser, etc.). For example, the system may require the purchaser use the scanning device associated with the locker bank computer to scan an image of the purchaser's driver's license. Other suitable systems and methods for confirming the identity of an individual are described elsewhere herein.

In various embodiments, the locker exchange server 200 may receive payment from the purchaser at the time of the online purchase (e.g., or in any other suitable manner other than at the time of pickup of the item by the purchaser). In such embodiments, the system may omit at least a portion of (e.g., all of) the payment step described with respect to Step 570 above.

In processing the purchaser's payment, the item exchange system 110 may charge any suitable transaction fee. The system may, for example, retain a transaction fee from the amount paid by the purchaser for the item (e.g., for the use of the locker bank 300). In other embodiments, the system may charge an additional fee (e.g., in addition to the purchase price) to the purchaser when the user picks up the item. In still other embodiments, the item exchange system 110 may be configured to provide a discount on the fee (e.g., or charge no fee) to users that have an account with a logistics service provider associated with the locker bank 300. For example, if the locker bank 300 is part of a network of locker banks operated by United Parcel Service of America, Inc. of Atlanta, Ga., the system may be configured to provide the use of the locker bank 300 for exchanges such as those described herein at a discounted rate for UPS MyChoice account holders (e.g., by virtue of UPS MyChoice being an account associated with United Parcel Service of America, Inc.).

VIII. In Response to Receiving Payment from the Purchaser, Open the Locker for the Purchaser to Retrieve the Item Continuing to Step 580, in response to receiving the payment from the purchaser, the locker bank computer 330 opens the locker 310A-310D for the purchaser to retrieve the item. This step is similar to Step 520 described above. Therefore, for purposes of ease of understanding and clarity, only certain aspects will be discussed to highlight the differences between Step 580 and Step 520. For example, rather than opening the locker 310A-310D for the seller to deposit the item into the locker 310A-310D, the locker bank computer 330 opens the locker 310A-310D for the purchaser to retrieve the item. As discussed above, the processes for opening the locker 310A-310D are similar for the purchaser to those involved in opening the locker 310A-310D for the seller.

C. Item Return Processing Module

Figure 6:
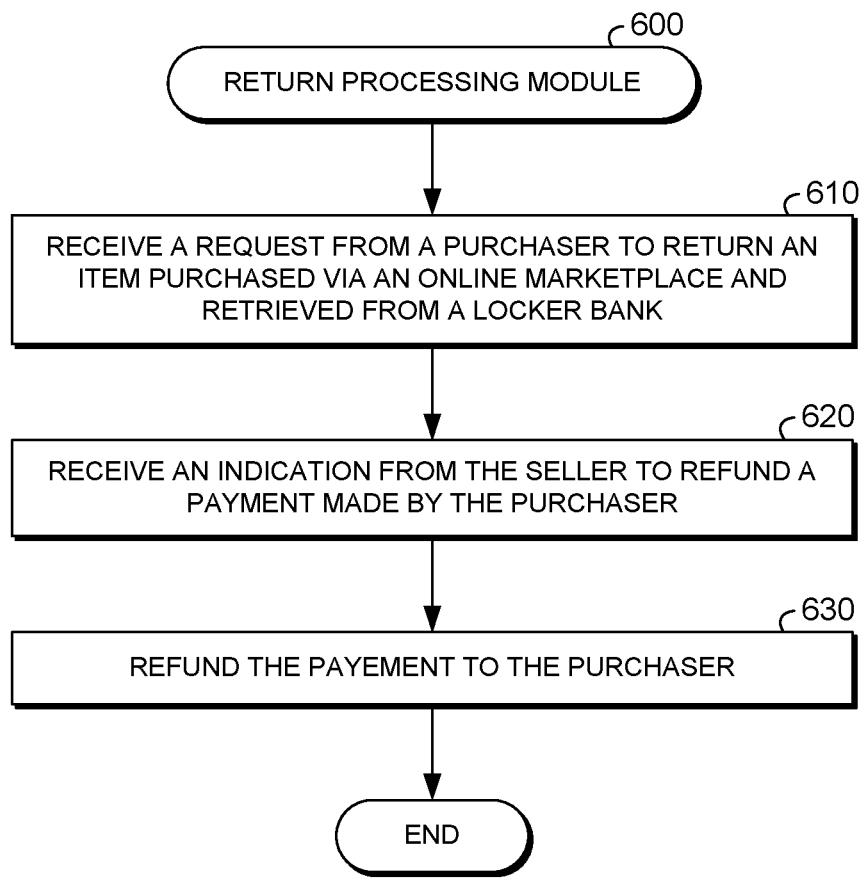
FIG. 6 depicts a flow chart that generally illustrates various steps executed by an Item Return Module that, for example, may be executed by the locker exchange server of FIG. 1.

FIG. 6 is a flow chart of operations performed by an exemplary Item Return Processing Module 600. In particular embodiments, the Item Return Processing Module 600 may facilitate the return of an item that was purchased and retrieved from a locker bank 300.

I. Receive a Request from a Purchaser to Return an Item Purchased and Retrieved from a Locker Bank Referring to FIG. 6, when executing the Item Return Processing Module 600, the locker exchange server 200 begins, at Step 610, by receiving a request from a purchaser to return an item that the purchaser purchased and retrieved from a locker bank 300 (e.g., such as through any suitable process described above).

When executing the Return Processing Module 600, the locker exchange server 200 may follow steps similar to Steps 530-550, as discussed above with reference to FIG. 5. Each of these steps may be performed in any suitable manner and may occur as described above with reference to the Locker Bank Operation Module 500. For example, similar to Step 520, the locker exchange server 200 may, in response to receiving the return request, open an appropriately sized locker 310A 310D to receive the item (e.g., through appropriate communications with the locker bank computer 330). Similar to Step 530, the locker exchange server 200 may then receive an indication that the item is in the locker 310A-310D and that the door of the locker 310A-310D has been closed and locked. In various embodiments, when opening an appropriately sized locker to receive the item, the locker exchange server 200 may open the same locker 310A-310D that the purchaser retrieved the item from.

The locker exchange server 200 may determine the locker that the purchaser retrieved the item from by, for example, receiving an indication, from an imaging device and/or sensor within a locker 310A-310D, that the purchaser placed the item back into the locker 310A-310D before closing the locker's door. Alternatively, the locker exchange server 200 may retain, in memory, a transaction code associated with the transaction, and may store an identifier of the previously-opened locker 310A 310D in memory in association with the transaction code. If the purchaser wishes to return the item, the purchaser may re-enter their transaction code using the locker bank's user interface 340. In response to receiving the transaction code (e.g., within a pre-determined time after the locker's door is closed), the locker exchange server 200 may re-open the same locker 310A-310D to receive the item from the purchaser for return. As a further alternative, the locker exchange server 200 may generate an item return code associated with the transaction and, for example, display and/or transmit the item return code to the user in response to the user completing the purchase of the item. If the purchaser wishes to return the item, the purchaser may enter their item return code using the locker bank's user interface 340. In response to receiving the item return code (e.g., within a pre-determined time after the locker's door is closed), the system may re-open the same locker 310A-310D to receive the item from the purchaser for return.

In other embodiments, the locker exchange server 200 (e.g., via communications with the locker bank computer 330) may open a different locker 310A-310D than the one the purchaser retrieved the item from. In particular embodiments, the locker exchange server 200 may open one or more appropriately sized lockers 310A-310D to allow the purchaser to select the appropriate locker 310A-310D to receive the item. Similar to Step 540, the locker bank computer 330 may capture an image of the item within the closed locker 310A-310D and communicate the captured image to the seller and/or the purchaser independently or via the locker exchange server 200.

In particular embodiments, the locker exchange server 200 may require the seller to confirm acceptance of the return from the purchaser prior to allowing the purchaser to deposit the item in the locker 310A-310D for return. In some embodiments, the confirmation of the return may be based on an image communicated to the seller. For example, for an item that the purchaser wishes to return, the locker exchange server 200 may require the purchaser to capture an image of the item via the locker bank's one or more imaging devices. The locker exchange server 200 may then, in various embodiments, transmit the image to the seller to confirm that the item is still in the original condition and acceptable for return (e.g., the locker exchange server 200 may enable the seller to accept or reject the return request).

In various embodiments, the locker exchange server 200 may be able to determine whether a particular item is acceptable for return. For example, if the seller has an account preference that states that no returns will be accepted, the locker exchange server 200 may deny the purchaser's request to return the item. In particular embodiments, the locker exchange server 200 may conditionally accept the return and capture an image of the item after the purchaser has placed the item into a locker 310A 310D and closed the locker 310A-310D. This may allow the seller to determine whether to accept the return or request the item exchange system 110 to dispose of the item in another way. For example, the seller may request that the item exchange system 110 contact a third party to donate the item to a particular charity. As a further example, the seller may request that the item be picked up by a logistics service provider so that the item may be shipped back to the seller, shipped to another purchaser or other third party, etc. In various embodiments, returned items may be left in the locker 310A 310D until the seller sells the item to another purchaser.

II. Receive an Indication from the Seller to Refund a Payment Made by the Purchaser At Step 620, the locker exchange server 200 receives an indication from the seller to refund a payment made by the purchaser. In various embodiments, the locker exchange server 200 may not have processed the payment yet and may, rather than refunding the payment, cancel the original payment. In some embodiments, the locker exchange server 200 may reverse the payment if it has already been processed. In particular embodiments, the locker exchange server 200 may hold the payment until the seller receives the item and approves the return of the payment to the buyer.

In various embodiments, the locker exchange server 200 may receive the indication regarding the refund in any suitable manner (e.g., an input on any computing device, input into the locker bank computer 330, etc.). In some embodiments, the locker exchange server 200 is configured to receive the indication from any suitable device (e.g., a mobile computing device, a wireless device such as a smart phone, a desktop computer, a laptop computer, a tablet, a touch-screen 340 associated with the locker bank, etc.). In particular embodiments, the locker exchange server 200 may receive the indication from a mobile computing device 125 associated with the seller. In various embodiments, the locker exchange server 200 may determine to automatically refund the payment after receiving an acceptance of the return from the seller based on pre-established instructions from the seller. In particular embodiments, the locker exchange server 200 may receive an indication to refund the payment after the item is placed back into a locker and the locker 310A-310D is closed.

In particular embodiments, the locker exchange server 200 may receive an indication from the seller to not refund the payment made by the purchaser. For example, the seller may dispute the condition of the returned item (e.g., the seller may take the position that item was damaged by the purchaser and therefore not approve the return) and even though acceptance of the return was made, the seller may not refund the purchaser's money. In some embodiments, the locker exchange server 200 may receive an indication from the seller to refund a partial amount of the payment made by the purchaser. For example, the seller may require the item be shipped to the seller and require that the purchaser pay for the return shipping. In some embodiments, the locker exchange server 200 may receive an indication from the seller to refund the payment made by the purchaser in a different form than how the payment was received. For instance, where the purchaser paid cash for the item using the locker bank's point of sale system, the seller may issue an electronic or cash payment to the purchaser. In particular embodiments, the locker exchange server 200 may receive an indication to refund the payment as a store credit with the seller.

III. Refund the Payment to the Purchaser

At Step 630, the locker exchange server 200 refunds the payment to the purchaser. In particular embodiments, the locker exchange server 200 may not have processed the payment from the purchaser at the time that the locker exchange server 200 receives the request to refund the purchaser's payment. In other embodiments, the locker exchange server 200 may transfer the payment back from the seller (e.g., to the purchase) by reversing the original financial transaction in which the purchaser provide payment to the seller. In some embodiments, the locker exchange server 200 may, in various embodiments, not refund the payment to the purchaser or may only refund a portion of the payment to the purchaser, for example, in instances as described above. In various embodiments, the locker exchange server 200 may refund the payment in any suitable manner (e.g., directly to the purchaser via the locker bank point of sale system, electronically to the purchaser, etc.). In particular embodiments, the locker exchange server 200 may refund the payment in any suitable form (e.g., credit, cash, bitcoin, etc.). In particular embodiments, the locker exchange server 200 may charge the seller and/or the purchaser a refund processing fee for processing the refund to the purchaser.

In various embodiments, after refunding the payment to the purchaser, the locker exchange server 200 may continue to store the item until the item is picked up by the seller and/or until the seller provides other instructions on what to do with the item. In particular embodiments, the locker exchange server 200 may charge the seller a holding fee for storing the item until disposition of the item. In particular embodiments, the locker exchange server 200 receive an indication from the seller to offer the item for sale to other users of the locker bank 300 via the locker bank touch screen 340 at least until the seller provides instructions for the disposition of the item. For example, another user may be retrieving another item from the locker bank 300 and the locker bank computer 330 may generate a notification to the user that the item is available for purchase in another locker 310A-310D and may provide the user with the image captured of the returned item.

IV. Return Items not Retrieved

In various embodiments, the locker exchange server 200 may determine to return the item to the seller if the item is not picked up by the purchaser within a predetermined amount of time without an explicit request from the purchaser to return the product. For example, the seller may set a time threshold (e.g., 3 days, 5 days, 1 week, or 24 hours) for the purchaser to retrieve the item. If the time threshold is met, the seller may be notified to retrieve the item. In other embodiments, the time threshold may be established independently by the item exchange system 110 and the seller notified to retrieve the item without a specific criteria being established by the seller.

Exemplary User Experience

Figure 7A:
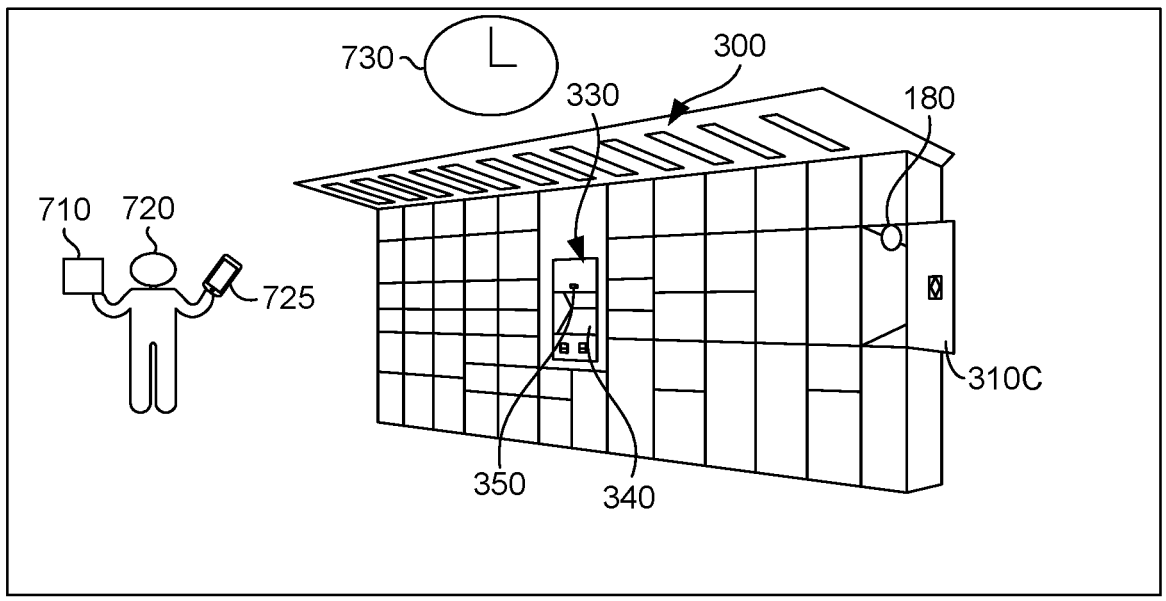
FIGS. 7A and 7B depict an exemplary user experience according to various embodiments.
Figure 7B:
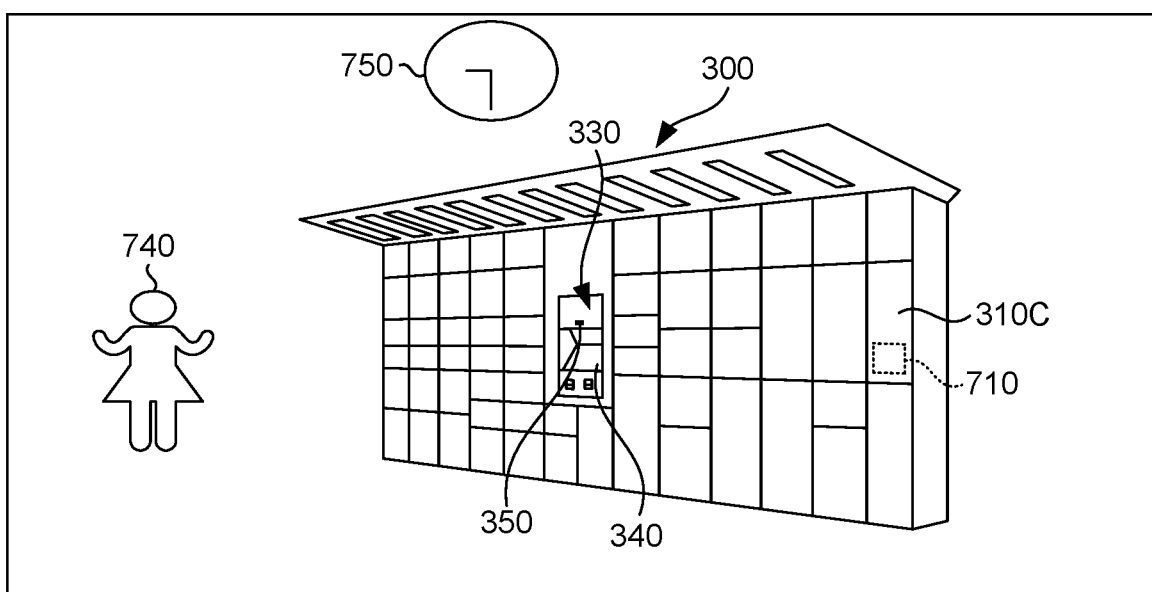

FIG. 7 depicts an exemplary user experience that may occur in the context of using the item exchange system 110 described above to facilitate the transfer of an item 710 for a purchase made online between a seller 720 and a purchaser 740. In a particular embodiment, after selling a particular item 710 via a marketplace, a seller 720 arrives at a first time 730 at a particular locker bank 300 selected by either the seller 720 or the purchaser 740. Using either the seller's mobile computing device 725 or a locker bank computer 330 associated with the locker bank 300, the seller 720 enters an access code, causing a particular locker 310C of a particular size large enough for the item 710 to open. Prior to placing the item 710 within the particular locker 310C, the locker bank computer 330 may instruct the seller 720 to capture an image of the item 710 using an exterior imaging device 350 associated with the locker bank computer 330. After placing the item 710 inside the particular locker 310C, the locker bank computer 330 via a display screen/touch screen 340 may instruct the seller 720 on how to close the locker 310C and lock it. Once the item 710 is inside the locked locker 310C, an interior imaging device 180 within the locker 310C may capture an image of the item 710. In various embodiments, the interior imaging device 180 may have an associated illumination device (not shown) to facilitate image capture. The item exchange system 110 may then send this captured image to the purchaser 740 to notify the purchaser that the item 710 is ready for pick up and to receive, from the purchaser 740, acceptance of the condition of the item 710 to confirm that the purchaser 740 will ultimately pick up the item 610 (rather than determining not to retrieve the item based on its condition). The system may further generate and send a unique access code to the purchaser 740 for use in retrieving the item 710 from the locker bank 300.

In response to receiving the captured image of the item 710 and deciding that the item 710 is in the expected condition, the purchaser 740 may arrive at a later time 750 at the locker bank 300 to pick up the item 710 that is located within the particular locker 310C. Using the locker bank touch screen 340, the purchaser 740 enters the unique access code into the locker bank computer 330. After receiving the access code, the locker bank computer 330 prompts the purchaser 740 to pay for the item 710. In response to receiving the payment from the purchaser 740, the locker bank computer 330 causes the locker 310C to open so that the purchaser 740 may retrieve the item 710.

Upon inspection of the item 710, the purchaser 740 may either decide to keep the item 710 or may decide to return the item 710 to the same locker 300 from which the purchaser received the item 710. If the purchaser 740 decides to return the item 710, the purchaser 740 and/or the system may notify the seller 720 that the item 710 has been returned to the particular locker 310C and is ready for pick up or further disposition by the seller 720. The system, as before, may also capture an image of the item 710 using the locker's interior imaging device 180 and send the captured image to the seller 720 for approval of the return. The system may then either reverse the purchaser's payment for the item 710, or facilitate a refund of the purchaser's payment (e.g., as discussed above).

Handling of Items that are not Picked Up

In various embodiments in which a purchaser fails to pick up an item placed in a locker 310A-310D by the seller (e.g., or embodiments in which the purchaser returns the item to the locker 310A-310D), the locker exchange server 200 may be configured to enable the seller to keep the item in the locker 310A-310D until another purchaser is found by the seller. In other embodiments, the locker exchange server 200 is configured to offer the item for sale to other people that use the locker bank computer 330 (e.g., to deposit items for sale, drop off parcels for pickup, pick up purchased items, etc.). The locker exchange server 200 may, for example, display, on the locker bank computer's display 340, the one or more images of the item, a description of the item, etc. The item exchange system 110 may offer the item for sale at a discounted price (e.g., a price lower than the original purchaser had agreed to purchaser it for).

In other embodiments, the item exchange system 110 may enable other users of the locker bank 300 (e.g., or any other suitable user) to place one or more bids on the item that remains in the locker. In such embodiments, the system may transmit a notification to the seller, and the seller may, in turn, accept or reject the bids. In response to the seller accepting a bid, the locker bank computer 330 may be configured to complete a sales transaction for the item with the bidder whose bid was accepted at the bid price.

In such embodiments, the item exchange system 110 may provide a listing (e.g., via a suitable software application, website, etc.) of all items up for sale (e.g., or up for auction) that are currently being stored within a network of locker banks 300 in a particular area. For example, a resident of Atlanta, Ga. may login to a software application of their smartphone that shows pictures and descriptions of items for sale that are currently stored in locker banks 300 in their area (e.g., where those items are stored in the locker bank 300 as a result of a failed transaction between a seller and an original purchaser). The resident may then bid on any of the items, or purchase them outright. In this example, the resident could then travel to the locker bank 300 in which they item they purchased was housed and pay for and retrieve it.

CONCLUSION

Many modifications and other embodiments of the invention will come to mind to one skilled in the art to which this invention pertains having the benefit of the teachings presented in the foregoing descriptions and the associated drawings. While examples discussed above cover the use of various embodiments in the context of exchange of an item for payment using a secure, computerized locker bank, various embodiments may be used in any other suitable context. For example, particular embodiments of the system may be utilized in the exchange of a first item for a second item. Various users of classified advertisements may, for example, deal in trade rather than money. Such users may desire to use a system such as that described herein to trade a first good from a first user with a second good from a second user.

Additionally, while various embodiments are described above as using one or more locker banks to facilitate the exchange of items, attended item distribution facilities could be used rather than lockers.

It should be understood, in light of the above disclosure, that the seller may be any suitable seller (e.g., an individual, a corporation, a company, a wholesaler, etc.). In particular embodiments, the purchaser may be any suitable purchaser (e.g., an individual, a corporation, a company, a wholesaler, etc.). In various embodiments, the marketplace may be any suitable marketplace, online or otherwise (e.g., an auction site, a classifieds site, an on-line retail site, a brick-and-mortar store, etc.) In various embodiments, the exchanges between the seller and the purchaser may be a business-tobusiness exchange, a business-to-consumer exchange, or consumer-to-consumer exchange.

Although the discussions above have indicated that certain functions are performed by specific components of the item exchange system 110, this designation is purely to facilitate understanding of various aspects of the invention. It should be understood that various components of the item exchange system 110, either independently or in combination with other components, could perform the described functions. For example, the functions described as being performed by the locker exchange server 200 could also be performed by the locker bank computer 330, either alone or in combination with the locker exchange server 200.

Therefore, it is to be understood that the invention is not to be limited to the specific embodiments disclosed and that modifications and other embodiments are intended to be included within the scope of the appended claims. It should also be understood that, although various events are described above as occurring "in response to" certain triggering occurrences, those events may occur in response to only those occurrences or a combination of the triggering occurrences and other occurrences. Although specific terms are employed herein, they are used in a generic and descriptive sense only and not for the purposes of limitation.

What is claimed is:

1. A locker bank comprising:
   a plurality of lockers that are physically connected together in the locker bank, wherein the locker bank includes a point-of-sale (POS) system for accepting payment from users, each respective locker comprising:
   (A) a housing defining an interior storage portion that is dimensioned for selectively receiving and storing one or more items, and
   (B) at least one door for selectively preventing access to one or more items stored within the interior storage portion;
   one or more computer systems that are located in the locker bank and control the locker bank, comprising a computer processor and memory, adapted for:
   (A) receiving a request, from a seller, to store an item within the locker bank beginning at a particular start time for a particular time period for later pickup by a purchaser who has purchased the item, wherein the request includes the particular start time and the particular time period;
   (B) in response to receiving the request from the seller, reserving a particular locker of the plurality of lockers to permit access to an interior storage portion of the particular locker, wherein the particular locker is reserved to store the item beginning at the particular start time and for the particular time period;
   in response to receiving no indication within a predetermined amount of time after the particular start time that the seller has attempted to access the locker, canceling the reservation of the locker;
   in response to receiving an indication within the predetermined amount of time after the particular start time that the seller has attempted to access the locker, opening a particular door of the particular locker of the plurality of lockers to permit access to the interior storage portion of the particular locker;
   (C) registering the closing and locking of the particular door, after the locker bank receives one or more particular items into the particular locker's interior storage portion;
   (D) after the step of registering the closing of the particular door, receiving a request, by the purchaser of the item to retrieve the one or more particular items from the locker;
   (E) in response to receiving the request to retrieve the one or more particular items from the locker, facilitating payment for the one or more particular items by the purchaser;
   (F) confirming that payment has been received for the one or more particular items; and
   (G) in response to confirming that payment has been received for the one or more particular items, unlocking a door of the particular locker so that the purchaser can retrieve the one or more particular items from the interior storage portion of the particular locker,
   wherein the one or more computer systems are adapted for preventing the use of the locker bank for facilitating the sale of items by one or more sellers who have not been validated to be trustworthy sellers.

2. The locker bank of claim 1, wherein the step of registering the closing and locking of the particular door comprises receiving one or more signals indicating that the particular door has been closed and, at least partially in response to receiving the one or more signals, locking the particular door.

3. The locker bank of claim 1, wherein the step of facilitating payment for the one or more particular items by the purchaser comprises facilitating payment for the one or more particular items via an account that the purchaser has with a logistics service provider.

4. The locker bank of claim 1, wherein the one or more computer systems are adapted for:
   after opening the door of the particular locker so that the purchaser can retrieve the one or more particular items, receiving an indication from the purchaser that the purchaser wishes to return the item to the locker;
   at least partially in response to receiving the indication from the purchaser that the purchaser wishes to return the item to the locker;
   receiving the item into an interior storage portion of a selected one of the plurality of lockers; and
   at least partially in response to receiving the item into the interior portion of the selected one of the plurality of lockers, facilitating closure and locking of the door of the selected locker in order to at least temporarily prevent access to the item.

5. The locker bank of claim 4, wherein the one or more computer systems are adapted for at least partially in response to receiving the item into the interior portion of the selected locker of the plurality of lockers, transmitting a message to the seller of the item indicating that the item has been returned.

6. The locker bank of claim 1, wherein the one or more computer systems are adapted for:
   after opening the door of the particular locker so that the purchaser can retrieve the one or more particular items, communicating to the purchaser that, if they wish not to accept the one or more items, they may return the one or more items to a locker within the locker bank within a predetermined period of time; and
   at least partially in response to the purchaser returning the one or more items to the locker within the locker bank within the predetermined period of time, cancelling a payment transaction, from the purchaser to the seller, for the one or more items.

7. The locker bank of claim 1, wherein:
the locker bank comprises at least one imaging device positioned to take an image of an item when the item is disposed within the interior storage portion of the particular locker; and
the one or more computer systems are adapted for:
after the step of facilitating closure and locking of the particular door and while the one or more particular items are within the interior storage portion of the particular locker, using the at least one imaging device to capture an image of the one or more particular items; and
storing the image to memory.

8. The locker bank of claim 7, wherein the one or more computer systems are adapted for, at least partially in response to receiving the request to retrieve the one or more particular items from the locker, communicating the image of the one or more particular items to the purchaser so that the purchaser can assess the presence or condition of the item.

9. The locker bank of claim 8, wherein the step of communicating the image occurs before the step of facilitating payment for the one or more particular items by the purchaser.

10. The locker bank of claim 1, wherein the one or more computer systems are adapted for preventing the use of the locker bank for facilitating the sale of items by the one or more sellers who have not been validated to be trustworthy sellers by a logistics service provider.

11. The locker bank of claim 1, wherein: the one or more computer systems are adapted for, after receiving the one or more particular items into the particular locker's interior storage portion, communicating item access information to the purchaser that the purchaser may use to gain access to the item from the locker bank; and
receiving a request from the purchaser of the one or more particular items to retrieve the one or more particular items from the locker, wherein receiving the request comprises receiving the item access information from the purchaser.

12. A locker bank comprising:
a plurality of lockers that are physically connected together in the locker bank, wherein the locker bank includes a point-of-sale (POS) system for accepting payment from users, each respective locker comprising:
  (A) a housing defining an interior storage portion that is dimensioned for selectively receiving and storing one or more items;
  (B) at least one door for selectively preventing access to one or more items stored within the interior storage portion; and
  (C) at least one camera for capturing an image of an item when the item is positioned within the interior storage portion, further comprising within the interior storage portion a suitable mechanism for rotating, spinning, or reorienting the item in the interior storage portion while the at least one camera within the interior storage portion take at least one image of the item; and
one or more computer systems that are located in the locker bank and control the locker bank, comprising a computer processor and memory, adapted for using the camera to capture the image of an item that is stored within the interior storage portion of a particular locker of the plurality of lockers, wherein the one or more computer systems are further adapted for:
  (A) receiving a request, from a seller, to store an item within the locker bank beginning at a particular start time for a particular time period for later pickup by a purchaser who has purchased the item, wherein the request includes the particular start time and the particular time period; and
  (B) at least partially in response to receiving the request:
    (i) reserving the particular locker of the plurality of lockers, wherein the particular locker is reserved to store the item within an interior storage portion of the particular locker of the plurality of lockers beginning at the particular start time and for the particular time period;
      a) in response to receiving no indication within a predetermined amount of time after the particular start time that the seller has attempted to access the particular locker, canceling the reservation of the particular locker;
      b) in response to receiving an indication within the predetermined amount of time after the particular start time that the seller has attempted to access the locker, opening a particular door of a particular locker of the plurality of lockers to permit access to the interior storage portion of the particular locker;
    (ii) receiving one or more particular items into the particular locker's interior storage portion; and
    (iii) registering the closing and locking of the particular door.

13. The locker bank of claim 12, wherein the one or more computer systems are adapted for transmitting the image of the item to a seller of the item.

14. The locker bank of claim 12, wherein the one or more computer systems are adapted for communicating the image of the item to a purchaser of the item.

15. The locker bank of claim 12, wherein the one or more computer systems are adapted for:
  (A) receiving a request from the purchaser of the item to capture the image of the one or more particular items within the particular locker's interior storage portion;
  (B) at least partially in response to capturing the image of the one or more particular items within the particular locker's interior storage portion, using the at least one camera to capture the image of the one or more particular items; and
  (C) storing the image to memory.

16. The locker bank of claim 15, wherein the one or more computer systems are adapted for, at least partially in response to receiving the request from the purchaser of the item to capture the image of the one or more particular items within the particular locker's interior storage portion, communicating the image of the one or more particular items to the purchaser so that the purchaser can assess the presence or condition of the item.

17. The locker bank of claim 16, wherein the one or more computer systems are adapted for:
  (A) after the step communicating the image of the one or more particular items to the purchaser, receiving a request, by the purchaser of the item, to retrieve the one or more particular items from the locker;
  (B) at least partially in response to receiving the request to retrieve the one or more particular items from the locker, facilitating payment for the one or more particular items by the purchaser;
  (C) confirming that payment has been received for the one or more particular items; and (D) at least partially in response to confirming that payment has been received for the one or more particular items, unlocking a door of the particular locker so that the purchaser can retrieve the one or more particular items from the interior storage portion of the particular locker.

18. The locker bank of claim 15, wherein the one or more computer systems are adapted for communicating the image to the seller.

19. An attended delivery/pickup location comprising:
a locker bank comprising a plurality of lockers that are physically connected together, wherein the locker bank includes a point-of-sale (POS) system for accepting payment from users;
one or more computer systems that are located in the locker bank and control the locker bank, comprising at least one computer processor and memory, that are individually or collectively adapted for:
(A) receiving a request, from a seller, to store an item at the attended delivery/pickup location beginning at a particular start time for a particular time period for later pickup by a purchaser who has purchased the item via a transaction made using an on-line marketplace, wherein the request includes the particular start time and the particular time period;
(B) in response to receiving the request from the seller, reserving a space at the attended delivery/pickup location for storing the item, wherein the space is reserved to store the item beginning at the particular start time for the particular time period;
a) in response to receiving no indication within a predetermined amount of time after the particular start time, that the seller has attempted to store the item at the attended delivery/pickup location, canceling the reservation of the space at the attended delivery/pickup location;
b) in response to receiving an indication within the predetermined amount of time after the particular start time, that the seller has attempted to store the item at the attended delivery/pickup location, receiving a confirmation of receipt of the item stored at the attended delivery/pickup location;
(C) after the step of receiving confirmation of receipt of the item stored at the attended delivery/pickup location, receiving a request, by the purchaser of the item to retrieve the item from the attended delivery/pickup location;
(D) at least partially in response to receiving the request to retrieve the item from the attended delivery/pickup location, facilitating payment for the item by the purchaser;
(E) confirming that payment has been received for the item; and
(F) at least partially in response to confirming that payment has been received for the item, facilitating transfer of the payment to the seller and facilitating transfer of the item to the purchaser.

20. The attended delivery/pickup location of claim 19, wherein the attended delivery/pickup location comprises:
one or more remote logistics servers comprising:
one or more processors and memory that stores transaction information for a plurality of transactions made via the on-line marketplace and payment information for the plurality of transactions, wherein the one or more processors are configured to update the transaction information and the payment information at least partially in response to transferring payment to the seller and transferring the item to the purchaser.

21. The attended delivery/pickup location of claim 19, wherein the on-line marketplace is selected from a group consisting of:
(1) an on-line retailer;
(2) an on-line auction site; and
(3) a classified advertising site.

22. The attended delivery/pickup location of claim 19, wherein the transaction made using the on-line marketplace comprises a transaction selected from a group consisting of:
(1) a business to business transaction;
(2) a business to consumer transaction; and
(3) a consumer to consumer transaction.

23. The attended delivery/pickup location of claim 19, wherein the attended delivery/pickup location further comprises:
the plurality of lockers, each respective locker comprising:
(A) a housing defining an interior storage portion that is dimensioned for selectively receiving and storing one or more items; and
(B) at least one door for selectively preventing access to one or more items stored within the interior storage portion; and
one or more locker computer systems, comprising a computer processor and memory, adapted for:
(A) receiving a request, from an employee associated with the attended delivery/pickup location, to store an item within the locker bank for later pickup by an individual who has purchased the item via the online marketplace;
(B) at least partially in response to receiving the request to store the item:
(i) opening a particular door of a particular locker of the plurality of lockers to permit access to an interior storage portion of the particular locker;
(ii) receiving one or more particular items into the particular locker's interior storage portion; and
(iii) registering the closing and locking of the particular door;
(C) after the step of registering the closing of the particular door, communicating to a purchaser of the item that the item is ready for pickup at the attended delivery/pickup location;
(D) receiving an indication, by an employee associated with the attended delivery/pickup location, that the purchaser is ready to pick up the item;
(E) at least partially in response to receiving an indication that the purchaser is ready to pick up the item, unlocking a door of the particular locker so that the employee associated with the attended delivery/pickup location can retrieve the item from the interior storage portion of the particular locker.

24. The attended delivery/pickup location of claim 23, wherein the one or more locker computer systems for:
(A) after the step of communicating to a purchaser of the item that the item is ready for pickup, communicating item access information to the purchaser that the purchaser may use to gain access to the item from the locker bank; and
(B) the step of receiving the indication that the purchaser is ready to pick up the item comprises receiving the item access information from the purchaser.

* * * * *

UNITED STATES PATENT AND TRADEMARK OFFICE
CERTIFICATE OF CORRECTION

PATENT NO. : 11,625,971 B2
APPLICATION NO. : 15/658071
DATED : April 11, 2023
INVENTOR(S) : Andrew Dotterweich and Jeffrey Cooper It is certified that error appears in the above-identified patent and that said Letters Patent is hereby corrected as shown below:

In the Specification

Column 19, Line 8 The line reading "embodiments, each locker 310A 310D may be equipped" should read --embodiments, each locker 310A-130D may be equipped--

Column 19, Line 30 The line reading "the seller to place the item into any of the open lockers 310A" should read --the seller to place the item into any of the open lockers 310A- --

Column 20, Line 1 The line reading "to determining that the door 390 of the locker 310A 310D" should read --to determining that the door 390 of the locker 310A-310D--

Column 20, Line 10 The line reading "locker 310A 310D in memory. In such embodiments, the" should read --locker 310A-310D in memory. In such embodiments, the--

Column 20, Line 22 The line reading "within the locker 310A 310D. For example, the locker bank" should read --within the locker 310A-310D. For example, the locker bank--

Column 22, Line 7 The line reading "the locker 310A 310D (and, optionally, after the purchaser" should read --the locker 310A-310D (and, optionally, after the purchaser--

Column 24, Line 12 The line reading "sized locker 310A 310D to receive the item (e.g.," should read --sized locker 310A-310D to receive the item (e.g.,--

Column 24, Line 30 The line reading "opened locker 310A 310D in memory in association with the" should read --opened locker 310A-310D in memory in association with the--

Column 25, Line 15 The line reading "purchaser has placed the item into a locker 310A 310D and" should read --purchaser has placed the item into a locker 310A-310D and--

Signed and Sealed this
Twenty-fifth Day of July, 2023

Katherine Kelly Vidal
*Director of the United States Patent and Trademark Office*

Column 25, Line 26 The line reading "locker 310A 310D until the seller sells the item to another" should read --locker 310A-310D until the seller sells the item to another--